(12) United States Patent
Turner et al.

(10) Patent No.: US 11,543,254 B2
(45) Date of Patent: Jan. 3, 2023

(54) METHODS AND SYSTEMS FOR ITEM DELIVERY ALONG DELIVERY ROUTES

(71) Applicant: United States Postal Service, Washington, DC (US)

(72) Inventors: Alison Frankowski Turner, Arlington, VA (US); Marc D. McCrery, Arlington, VA (US); James J. Boldt, Leesburg, VA (US)

(73) Assignee: United States Postal Service, Washington, DC (US)

( * ) Notice: Subject to any disclaimer, the term of this patent is extended or adjusted under 35 U.S.C. 154(b) by 336 days.

(21) Appl. No.: 16/818,982

(22) Filed: Mar. 13, 2020

(65) Prior Publication Data

US 2020/0292346 A1 Sep. 17, 2020

Related U.S. Application Data

(60) Provisional application No. 62/819,075, filed on Mar. 15, 2019.

(51) Int. Cl.
| | |
|---|---|
| *G01C 21/34* | (2006.01) |
| *G06Q 10/08* | (2012.01) |
| *G06Q 10/04* | (2012.01) |
| *B60W 50/04* | (2006.01) |

(52) U.S. Cl.
CPC ....... *G01C 21/3492* (2013.01); *B60W 50/045* (2013.01); *G06Q 10/047* (2013.01); *G06Q 10/08355* (2013.01); *B60W 2050/046* (2013.01)

(58) Field of Classification Search
CPC ............ G01C 21/3492; G01C 21/343; B60W 50/045; B60W 2050/046; G06Q 10/047; G06Q 10/08355
See application file for complete search history.

(56) References Cited

U.S. PATENT DOCUMENTS

| | | | |
|---|---|---|---|
| 2006/0167734 A1 | 7/2006 | Scott et al. | |
| 2015/0177011 A1* | 6/2015 | Ibrahimi | G01C 21/343 |
| | | | 701/465 |
| 2017/0262790 A1 | 9/2017 | Khasis | |

* cited by examiner

*Primary Examiner* — Brian P Sweeney
(74) *Attorney, Agent, or Firm* — Knobbe Martens Olson & Bear LLP

(57) ABSTRACT

A system and method of augmenting a delivery route. The method comprises receiving first location information from a first position device and receiving second location information from a second position device. The method further comprises storing the first and second location information in a memory structure and determining, based on at least one of the first and second information, a time and a location for each of a plurality of stops. The method also comprises reconciling the determined time and location of each of the plurality of stops with a stored route comprising a plurality of stored stops, the stored stops having a stored location and a stored time associated therewith and estimating a plurality of transition times between pairs of the plurality of stops. The method further also comprises constructing an updated timeline based on the plurality of stored stops, the plurality of determined stops, and the plurality of transition times and updating the delivery route based on the constructed timeline.

10 Claims, 10 Drawing Sheets

METHODS AND SYSTEMS FOR ITEM DELIVERY ALONG DELIVERY ROUTES

CROSS-REFERENCE TO RELATED APPLICATIONS

This application claims benefit of priority to U.S. provisional Application No. 62/819,075, filed Mar. 15, 2019 and entitled METHODS AND SYSTEMS FOR ITEM DELIVERY ALONG DELIVERY ROUTES, the entirety of which is incorporated by reference herein for all purposes.

BACKGROUND

Delivery services and corresponding routes are becoming more commonplace. As more service providers offer such delivery services, identifying and improving on efficiencies of the delivery routes is important. Part of identifying and improving efficiencies may involve identifying and correlating existing delivery routes with actual delivery point and tracking data. Furthermore, updating and/or creating new delivery routes based on demand (for example, including on-demand requests) is critical in maintaining and/or improving efficiencies. Therefore, additional techniques of identifying and improving efficiencies of delivery routes are needed.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features provide advantages that include data authentication services.

In one aspect, a method of augmenting a delivery route is disclosed. The method comprises receiving first location information from a first position device, receiving second location information from a second position device, and storing the first and second location information in a memory structure. The method further comprises determining, based on at least one of the first and second information, a time and a location for each of a plurality of stops and reconciling the determined time and location of each of the plurality of stops with a stored route comprising a plurality of stored stops, the stored stops having a stored location and a stored time associated therewith. The method also comprises estimating a plurality of transition times between pairs of the plurality of stops, constructing an updated timeline based on the plurality of stored stops, the plurality of determined stops, and the plurality of transition times, and updating the delivery route based on the constructed timeline.

In another aspect, a system for augmenting a delivery route is disclosed. The system comprises a communication circuit, a data store, and a computing device comprising a processor and a memory and configured to execute computer-executable instructions. The communication circuit is configured to receive first location information from a first position device and receive second location information from a second position device. The data store is configured to store location information and information regarding a route comprising a plurality of expected stops and an expected timeline. The computing device is executes the instructions to store the first and second location information in the data store. The computing device further executes the instructions to determine, based on at least one of the first and second information, a time and a location for individual stops of a plurality of stops and reconcile the determined time and location of the individual stops with the expected stops of the route, the expected stops having an expected stop location and an expected stop time associated therewith. The computing device also executes the instructions to estimate a plurality of transition times between pairs of the plurality of stops, construct an updated timeline based on the plurality of expected stops, the plurality of stops, and the plurality of transition times, and update the expected timeline of the route based on the updated timeline.

BRIEF DESCRIPTION OF THE DRAWINGS

These drawings and the associated description herein are provided to illustrate specific embodiments of the invention and are not intended to be limiting.

DETAILED DESCRIPTION

Figure 1:
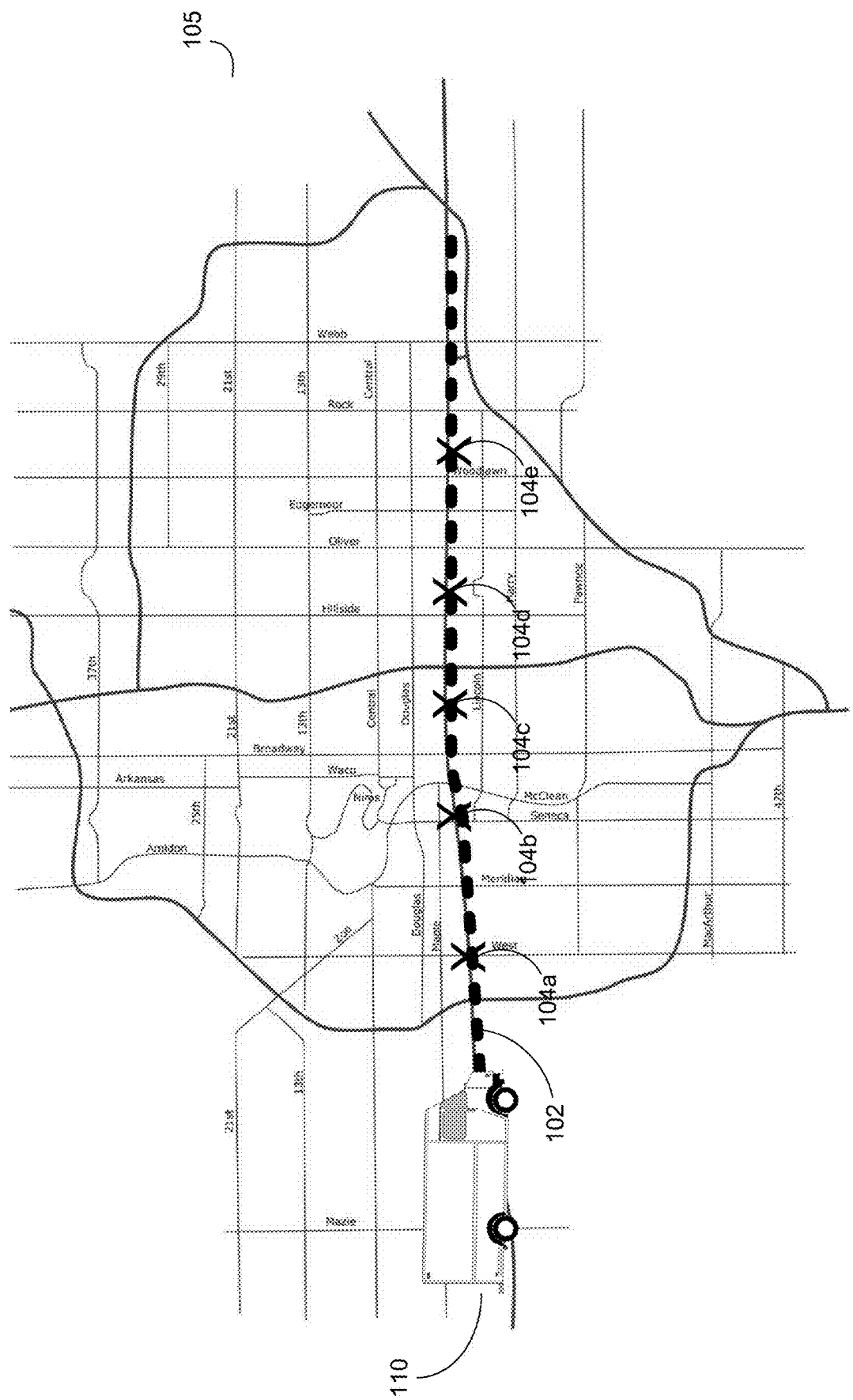
FIG. 1 is an overview diagram of a geographic region in which a localized delivery system (not shown) is implemented.

The features, aspects and advantages of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

The present disclosure relates to systems and methods for generating and/or augmenting carrier routes for delivery services. In some embodiments, the systems and methods disclosed herein are configured to receive customer requests and, based on the customer requests and carrier statuses, update routes and corresponding schedules of the route carriers based on existing route information and the customer requests. In some embodiments, the systems and methods disclosed herein are configured to receive data from the carriers and use this data to augment and/or generate new carrier routes to improve efficiencies in the delivery services provided by the carrier.

As used herein, the term "item" may refer to discrete articles in an item distribution network, such as mail pieces, letters, flats, magazines, periodicals, packages, parcels, goods handled by a warehouse distribution system, baggage in a terminal, such as an airport, etc., and the like. The term item can also refer to trays, containers, conveyances, crates, boxes, bags, and the like. As used herein, the term "carrier" may refer to an individual assigned to a route who delivers the items to each destination along the route. The term may also refer to other delivery resources, such as trucks, trains, planes, automated handling and/or delivery systems, and other components of the distribution network that travel the delivery route.

Additionally, as used herein, the term "resident" may refer to any individual or entity that resides, works, visits, or is associated with an address. For example, as used herein, a person at his or her office is a resident, as is a student or teacher at a school. As used herein, a resident can be an entity capable of sending items from an address and receiving items at an address. Additionally, the term "residence" may refer to any building having an assigned physical address, such as a house, an office building, an apartment, a factory, a school, etc. As used herein, a residence can be any location capable of being a destination for items within the distribution network or a source for items in the distribution network.

For example, an item delivery service (IDS) such as the United States Postal Service (USPS), the United Parcel Service (UPS), or Federal Express (Fed-Ex) may deliver items (for example, mail), such as letters, flats, parcels, packages, etc., according to static or dynamic routes. The USPS will be used in the present disclosure to describe exemplary embodiments, but the present disclosure is not limited thereto. When referencing generically to any of the services listed above or any IDS in addition to those listed above, the phrase "item delivery service, distribution service, distribution system, or IDS" will be used to indicate such generalities.

In some embodiments, the distribution service(s) may deliver and/or pickup items over a large geographic area that is divided into one or more delivery routes. In some embodiments, the route(s) that carriers travel may be generated based on address information within the geographic area. Accordingly, the routes may not account for variances or details that are particular to addresses or delivery points or paths between successive addresses or delivery points. For example, when initially generating the route(s), an apartment building may be determined to include only one delivery stop or point while, in actuality, each apartment has its own delivery stop or point. Alternatively, the initial generated route(s) may not account for traffic occurrences or variances based on times of day. For example, the initial route(s) may not account for speed limits in school zones that fluctuate based on time of day or high density traffic lights that are only active during high traffic periods (for example, rush hour) or streets or paths with usage that changes based on time of day (for example, changing express lanes and roads, and so forth). In distribution services that track efficiencies and/or grade carrier service based on how well the carrier's movements for the day track their corresponding routes, such deficiencies in the initial route or traffic occurrences can affect the carrier's efficiencies or grade because the route to which the carrier's movements are compared is incorrect. Systems and methods configured to dynamically augment existing and/or create new routes based on information from the carrier's movements may improve carrier efficiencies and grades.

The USPS delivers items, such as mail and packages, to every physical address in the United States on a daily basis, Monday through Saturday. The USPS is tasked with providing secure, reliable, and affordable delivery of items to every address in the United States, U.S. territories, and U.S. military installations worldwide. For example, the USPS delivers more than 528 million items to over 152 million destinations (addresses) every day. In delivering these items to each of these addresses, in the United States and worldwide, the USPS may establish numerous routes for carriers to travel when distributing the mail.

FIG. 1 is an overview diagram of a geographic region 105 in which a localized delivery system (not shown) is implemented. The delivery system, described with further reference to FIG. 2, may comprise or utilize an automated system, a software interface, or a live attendant, for example. The delivery system includes or utilizes a delivery vehicle 110 traveling across the geographic region 105. At any particular time, a first delivery vehicle 110 may be located along a first route 102. One or more other delivery vehicles (not shown) may travel across the geographic region 105 along other routes. In some embodiments, the delivery vehicle 110 may be part of one or more transportation services and may travel according to one or more delivery routes that are static and predetermined or dynamic and variable.

The route 102 may comprise one or more stops 104*a*-104*e* within the geographic region. The delivery vehicle 110 may travel along the route 102 and stop at the one or more stops 104*a*-104*e* to pick up or drop off one or more items. In some embodiments, the stops are at businesses, residences, or other standalone mailbox locations. Accordingly, the stops may be located in close proximity to each other or with large distances between one or more of the stops. Though the route 102 as shown is generally straight, the route 102 may include any number of turns, stops, etc.

In some embodiments, the stops 104 shown on the route 102 correspond to dynamic or static stops. The dynamic stop is a stop that is dynamically added or removed from the route 102 while the delivery vehicle 110 is traveling along the route 102. For example, while the delivery vehicle 110 is traveling along the route 102, a customer may contact the delivery system operating in the geographic region 105 to request or coordinate a pickup and/or delivery of an item or good. The static stop is a stop that is not added or removed from the route 102 while the delivery vehicle 110 is travelling along the route 102 but rather is permanently part of the route 102.

The delivery system faces costs for use of the delivery vehicle 110, either via a contract with a third-party or directly through a driver, operator, etc., that is associated with the delivery system (for example, an employee of the delivery system). The delivery system may use the route 102 to estimate the costs of the delivery vehicle 110 and driver, etc. For example, the delivery system uses the route 102 to estimate an expected amount of time for travel along the route 102 and servicing of the stops 104*a*-104*e* and uses this estimated amount of time to then generate the cost for the route 102, which may include a wage for the carrier, costs of the delivery vehicle 110, etc. Accordingly, accurate information regarding the route 102 is useful in estimating an accurate cost for the route 102. Furthermore, while the route 102 accounts for stops at each address along the route, in every day operation, only a subset of the stops may generally be required, and the information regarding the route 102 may account for either the full route 102 (with all stops) or only an average of the subset of stops generally required.

The delivery system may include one or more components that utilize information from the delivery vehicle 110 and/or the driver of the delivery vehicle 110 to generate and/or update the route 102 along which the delivery vehicle 110 travels to pick up and distribute items.

The disclosed methods and systems can be used on a local level, such as depicted in FIG. 1, and can be used on a city or town level, a county level, a state level, a regional level, a national level, or with any desired geographic area.

Figure 2:
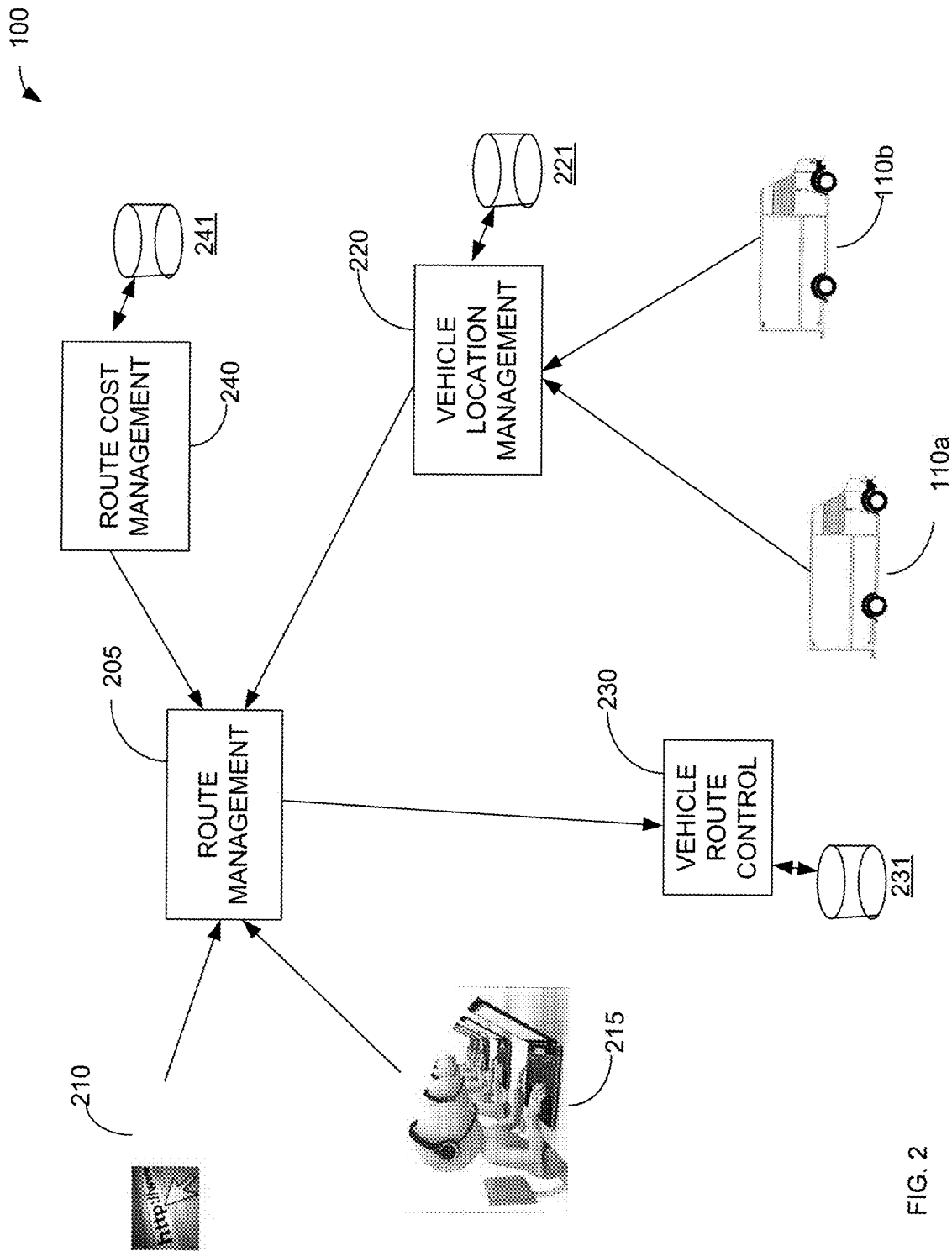
FIG. 2 is an exemplary block diagram of a portion of the localized delivery system.

FIG. 2 is an exemplary block diagram of a portion of the localized delivery system 100. The localized delivery system 100 (also referred to herein as the delivery system 100) includes a route management component 205, a vehicle location management component 220, a vehicle location database 221, a vehicle route control component 230, a vehicle route database 231, a cost management component 240, and a route cost database 241. Each of the route management component 205, the vehicle location management component 220, the vehicle route control component 230, and the route cost management component 240 comprises one or more of a networked computer system, a server, or similar system configured to receive information from one or more sources, including customers, delivery vehicles 110, etc., and process the received information electronically. In some aspects, the information received from customers may be received via a computer portal or interface 210, such as a website, an internet-enabled computing device, a software application, a smartphone, or the like. In some aspects, the information received from customers may be received from electronically from a call center 215, with the customer calling into the call center 215 or showing up in person to communicate a request, where the request comprises a change in a route (i.e., an added or removed stop) for one of the delivery vehicles 110 associated with the delivery system 100.

In some aspects, the route management component 205 receives location information, such as Global Positioning System ("GPS") information and/or time information, from the delivery vehicle(s) 110 via the location management component 220. For example, the delivery vehicle 110 includes two GPS devices, one of which is considered part of the delivery vehicle 110 (e.g., the first GPS device 805, shown in FIG. 8) and the other being considered part of the driver or operator (also referred to herein as the carrier) (e.g., the second GPS device 810, shown in FIG. 8). In some embodiments, the location management component 220 receives GPS information from the two GPS devices at or of the delivery vehicle(s) 110 via one or more communication systems. The location management component 220 also preprocesses the received GPS information and appends time information to the received GPS information as needed if the received GPS information does not already include time information. In some embodiments, the location management component 220 may perform one or more of the processes described herein by implementing an algorithms. In some embodiments, the vehicle location management component 220 may store information (for example, received GPS information, etc.) in a vehicle location database 221.

In some aspects, the route management component 205 uses the GPS information received from the vehicle location management 220 (and/or any information determined from an analysis of the GPS information) to track delivery vehicles 110 and manage routes 102 of the delivery vehicles 110. Accordingly, the route management component 205 uses the vehicle route control component 230 to create new routes 102 and/or update existing routes. For example, via the route management component 205, the delivery system may track and/or monitor all routes 102 associated with the delivery system and its delivery vehicles 110. In some embodiments, the various information regarding the routes 102 is stored in the route database 221.

The route cost management component 240 may determine and/or track costs of the routes 102. Cost components of the routes 102 may be used to evaluate the routes, for example, to determine how to adjust them to make them more efficient and/or cost effective. Details of the route cost may be saved in the cost database 241.

In some embodiments, the delivery system 100 may work to make its routes 102 more efficient. For example, the delivery system may monitor efficiencies of existing routes 102, monitor efficiencies of delivery vehicles 110 and carriers on their routes 102, and determine how to improve existing routes 102, combine existing routes 102, and generate new routes 102. In some embodiments, such changes and/or improvements may be made based on an analysis of information regarding the routes 102 and based on GPS information received from delivery vehicles 110 traveling along their routes.

Details of how the GPS information from the GPS devices of the delivery vehicle 110 can be used in conjunction with existing routes 102 are described below. As noted above, GPS information (such as GPS readings) may be received from the GPS devices of the delivery vehicle 110. Details of how the delivery system 100 (and its various components and modules) use GPS data in conjunction with existing routes are provided below. The delivery system 100 may perform any or all of the processing, analysis, algorithm application, and so forth described below. In some embodiments, the delivery system 100 comprises a computing device (for example, described below with reference to FIG. 9) to perform any processing, analysis, etc., described herein.

GPS Data Smoothing

In some aspects, preprocessing the received GPS information includes or involves smoothing the location information received from the delivery vehicle 110 by the location management component 205. GPS information alone is inherently inaccurate. Accordingly, information derived from the GPS information alone, such as speed and heading values, can also be inaccurate because these values may be sensitive to successive positions reported by the GPS information. For example, small changes in the received GPS information can induce large apparent differences in speed and heading. For example, each reported GPS information (i.e., position) may have associated therewith a region of uncertainty. When GPS positions are reported with small distances therebetween, the regions of uncertainty may overlap, meaning the overall uncertainty increases. This uncertainty provides for a variability in any speed and/or heading computed based on the GPS positions, which is problematic when using GPS information to determine whether and when the delivery vehicle 110 is stopped along the route 102 at one of the stops 104a-104e and/or the heading of the delivery vehicle 110 before and/or after one of the stops 104a-104e.

Accordingly, the GPS information is smoothed to reduce the variability in the calculated speed and/or heading. In some aspects, the GPS devices of the delivery vehicle 110 may automatically perform such smoothing. However, if the GPS devices do not themselves perform smoothing of GPS position information, the location management component 220 performs the smoothing, especially if one of the GPS devices reports GPS information at a high rate (for example, 10 hertz ("Hz")) of successive GPS position readings (for example, from the first GPS device 805). In some aspects, knowledge of travel patterns for the delivery vehicle 110 inform the smoothing of the GPS data. For example, assumptions that the delivery vehicle 110 will generally not undergo "too much" acceleration or deceleration (for example, acceleration or deceleration greater than a value X) or "too rapid" change in direction (for example, greater than a value Y). Such assumptions may allow for replacement of each reported GPS location based on or with a weighted average of surrounding GPS locations. Similarly, speed and heading computations may be based on locations before and/or after the received GPS location in question. Alternatively, or additionally, more sophisticated techniques for smoothing are implemented, such as application of a Kalman filter and so forth.

The process of smoothing GPS information includes various steps, including multiple passes through the received GPS information as well as identification of start and stop times or scans, before and/or after which all received GPS information will be discarded. The start and stop times correspond to the time when the delivery vehicle 110 left a location (for example, the storage or overnight location) and returned to the location. Discarding GPS information received outside of this time range means that only GPS information obtained while the delivery vehicle 110 travelled along the route 102 is used as described herein.

The first pass smoothing of the GPS information may perform averaging of consecutive GPS readings. For example, the GPS information may be averaged according to 2k+1 consecutive GPS readings ($x_0$, $x_1$, . . . , $x_{2k}$). Accordingly, coordinates of location k are replaced with a weighted average of surrounding locations and a tentative speed and/or heading corresponding to location k is assigned to the location k based on distances and headings of the locations $x_0$ to $x_{2k}$. Thus, in the first pass, each GPS position is replaced with a weighted average of all GPS positions with a defined radius, where the radius is a set number of GPS positions. For example, the radius may include five GPS positions. Accordingly, each received GPS position is replaced with an average of the five GPS positions before and after the received GPS position. As such, the smoothing radius, k, in this example is 5. In some aspects, the smoothing radius is set to 6 for use with the GPS device(s) of the delivery vehicle 110. Additionally, in some aspects, greater weighting is applied to nearby GPS information. In some embodiments, a value of k=6 is preferable for the GPS device(s) indicative of a position of the delivery vehicle 110. In some embodiments, the value of k may be selected to give more weight to nearby GPS readings.

In some embodiments, the first pass of smoothing performed by one of the delivery vehicle 110 or the location management component 220 is effective to remove much of the jitter from the location data. However, jitter may still exist at slow speeds or stops. To counter this jitter that occurs at slow speeds or stops, one of the delivery vehicle 110 or the location management component 220 may replace the heading at location k with a median of the headings of surrounding locations k+/−1, 2 . . . n (for example, the one or more headings for the n k values on either side of k). Additionally, the jitter at slow speeds or stops may also be countered by replacing the speed of the delivery vehicle 110 at the location k with a minimum speed of the location k and a median of the speeds at surrounding locations k+1, n on either side of the location k.

Estimate Vehicle Stops

As generally known, GPS information may be used to determine a position for a vehicle when the GPS device is included in the vehicle. Similarly, GPS information can be used to determine the position of the delivery vehicle 110. However, GPS readings from the GPS devices at the delivery vehicle 110 may continue to show movement even when the delivery vehicle 110 itself is stationary. This, as noted above, may be due to the jitter received in GPS readings.

When the delivery vehicle 110 is stopped, the speed of the delivery vehicle 110 as determined based on the GPS readings may reported to be very small or null (depending on the GPS devices and the GPS logging software). Similarly, while the delivery vehicle 110 is stopped, the heading of the delivery vehicle 110 (as based on the GPS readings) may also be reported as null or being very small. In some embodiments, the speed and the heading may vary considerably.

Thus, to identify stops of the delivery vehicle 110, the GPS readings from the delivery vehicle 110 may be analyzed according to the following sequence. First, the stream of GPS readings from the delivery vehicle 110 is analyzed to identify a subset of sequential GPS readings during which the velocity of the delivery vehicle 110 is indicated as being sufficiently small. The "sufficiently small" velocity may be selectively established as needed dependent upon an accuracy or precision required in the stop determination and the frequency of readings from the GPS devices of the delivery vehicle 110. For example, a reasonable "sufficiently small" value is 1.5 meters/second. For GPS devices of the delivery vehicle 110 that record GPS readings at a very high frequency, the desired subsequence should extend for at least a half-second, or some length of time that is slightly less than the length of the shortest imaginable stop, considering that the driver of the delivery vehicle 110 presumably must move his or her foot from the brake to the accelerator.

Additionally, subsequences of GPS readings indicating the sufficiently small velocity may be interpreted as stops of the delivery vehicle 110. Even though the speed of the subsequences may be reported to be very small or null, the GPS readings will have different latitudes and longitudes. Thus, for each such subsequence of GPS readings, a stop can be determined based on the average latitude, longitude, and heading of the subsequence of GPS readings having the sufficiently small velocity. For the determined stop, a time of arrival is interpreted to be the time of the earliest GPS reading in the subsequence minus one-half the standard time between GPS readings and the time of departure from the determined stop is the time of the latest GPS reading in the subsequence plus one-half the standard time between GPS readings.

Furthermore, stops that are sufficiently close in time or physical space, when reviewed or analyzed in chronological order, may be combined into a single stop. For example, if two presumed stops are separated by no more than 2 seconds or less than a couple feet, the two stops may be determined to represent a single, longer stop that begins with the arrival time of the first stop and ends with the departure time of the second stop. For these "combined" stops, the location, speed, and heading of the "combined" stop are each computed as weighted averages of the location, speed, and heading, respectively, of the contributing stops, with the weights being proportional to the respective durations. Finally, stops that are implausibly short (for example, less than 1 second) are filtered out.

Figure 3:
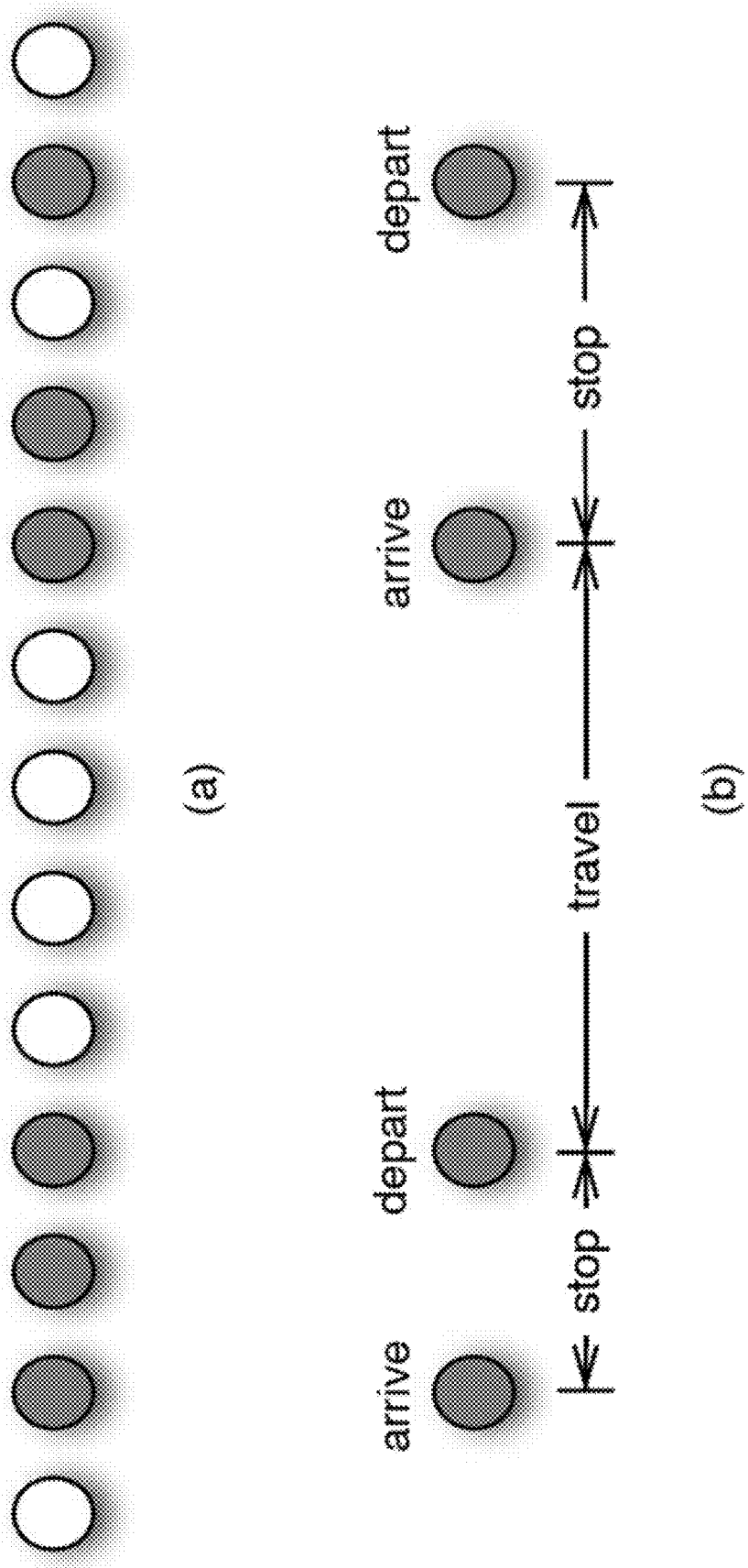
FIG. 3 is a diagram depicting an example of determining stops based on parameters of GPS readings.

FIG. 3 is a diagram depicting an example of determining stops based on parameters of GPS readings. The top part (a) of the diagram shows the plurality of GPS readings received from one or both of the GPS devices. The position of the circles does not necessarily indicate relative location, but are arranged chronologically, based on the time the readings were taken. The circles represent the GPS readings and are equally spaced to represent the relative frequency at which the readings are made and received. The shaded circles indicate GPS readings determined to be associated with a stop while unshaded circles represent GPS readings received while the delivery vehicle 110 is engaged in an activity other than at a delivery stop, such as moving, stopped in traffic, stopped for a break, moving on foot, and the like. The depicted sequence of circles includes a first unshaded circle, three shaded circles, four unshaded circles, two shaded circles, and three circles that alternate from unshaded to shaded to unshaded. The bottom part (b) of the diagram shows how the shaded circles from the top part (a) of the diagram are interpreted to be times when the delivery vehicle 110 is either stopped or when it is traveling between stops. In some embodiments, the system determines that the third, moving stop among the 4 circles in part (a) may not deviate from a particular location, or may be within a given distance from one or more of the other circles, such that the 4 consecutive GPS readings are determined to be a single stop.

As shown, the shaded circles in the top part (a) are interpreted to be associated with two stops. By comparing the top part (a) and the bottom part (b), a first sequence of sequential shaded circles identifies a first stop, a sequence of multiple unshaded circles represents the delivery vehicle 110 moving, and a second stop is identified where three out of four sequential circles are shaded. Although one of the GPS readings may indicate movement, the system can determine that where 3 of 4 consecutive readings indicate a stop. In some embodiments, other fractions or ratios can be used to determine a stop. Thus, the bottom part (b) includes a first shaded circle determined to be when the delivery vehicle 110 arrives at the first stop, a second shaded circle determined to be when the delivery vehicle 110 departs the first stop, a period of when the delivery vehicle 110 travels from the first stop to the second stop, a third shaded circle determined to be when the delivery vehicle 110 arrives at the second stop, and a fourth shaded circle determined to be when the delivery vehicle 110 departs the second stop. The determined arrival and departure points for the bottom part (b) align with the corresponding shaded circles in the top part (a).

The resulting list of GPS stops may include unplanned stops, for example stops induced by traffic. However, the resulting list of GPS stops may also omit some planned stops, such as those that are sufficiently close together that an analysis of the GPS readings from the delivery vehicle 110 is unable to distinguish between the planned stops. Accordingly, additional analysis of the GPS readings may be used to distinguish between GPS stops that include two or more planned stops and those GPS stops that are merely longer than others or average.

Reconciling Data from Two GPS Devices

In some embodiments, each delivery vehicle 110 includes two GPS devices that provide GPS readings, as described above. For example, some hardware integrated into the delivery vehicle 110 may send a first GPS signal from a first GPS device 805, and a mobile delivery device (MDD) having the second GPS device 810 can send a second GPS signal. Both of these devices may independently transmit GPS readings to one of a controller in the delivery vehicle 110 or the location management component 220. Accordingly, stops may be duplicated if the GPS readings from both of the GPS devices from the same delivery vehicle 110 are analyzed, especially because, in general, the two GPS devices will not agree precisely with respect to the locations (i.e., the longitude and latitude) of stops nor on the start or end times of the stops. Below is provided a method for reconciling stops that are independently identified from the readings of the two GPS devices but that actually refer to or represent the same stop.

When the delivery system 100 analyzes the GPS readings received from the two GPS devices of the delivery vehicle 110, the delivery system 100 gives priority to time information for the GPS readings over location information, as the time information is generally more accurate that the location information. Furthermore, if analysis of the first GPS information from one of the GPS devices indicates a stop occurred and provides details of the stop, then the delivery system determines that the stop occurred even if not supported by GPS readings from both GPS devices (e.g., the second GPS information from the second GPS device conflicts with the first GPS information). In some embodiments, if the two GPS devices are in irreconcilable disagreement, the delivery system 100 gives priority to the second GPS device (of the carrier/operator) over the first GPS device 805 of the delivery vehicle 110, because the carrier may interact with the second GPS device 810 more than the first GPS device 805. Furthermore, the first GPS device 805 may be more vulnerable to disruption, therefore making the readings from the first GPS device 805 less reliable than the second GPS device 810. When both GPS devices identify stops at generally relative times and positions, the corresponding times and positions may be averaged because the average of the two stops is guaranteed to be more accurate in time and location than just the GPS readings from a single stop.

Figure 4:
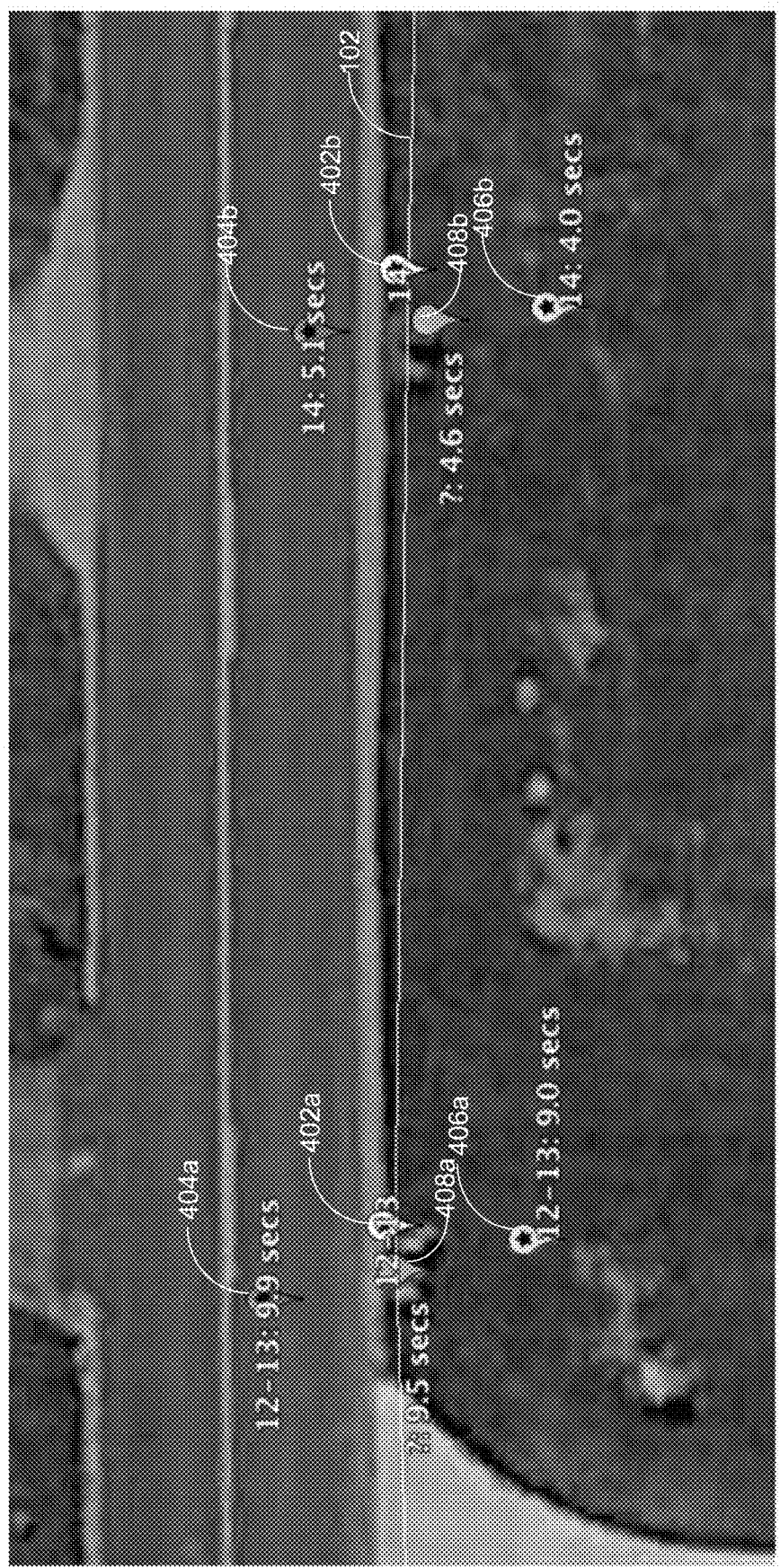
FIG. 4 is a map showing a route along a road with route stops, GPS locations from two GPS devices, and consensus stops shown.

FIG. 4 is a map showing a route 102 along a road with route stops, GPS locations from two GPS devices, and consensus stops shown. The map shows a line representing the route 102 with pins 402a and 402b that fall on the line. The line represents the route 102 while the pins 402a and 402b that fall on the line represent expected stops along the route 102. Two pins 404a and 404b shown on the road surface pertain to those GPS readings received from the first GPS device 805 of the delivery vehicle 110 while the pins 406a and 406b found in the grass away from the road represent those GPS readings received from the second GPS device 810. The fourth set of pins 408a and 408b that fall close to but not on the line representing the route 102 represent the consensus stops developed based on the average of the pins 404a and 404b from the first GPS device 805 and pins 406a and 406b from the second GPS device 810. For example, the location of the pin 408a is determined based on averaging the pin 404a from the first GPS device 805 and the pin 406a from the second GPS device 810, and the location of the pin 408b is determined based on averaging the pin 404b with the pin 406b. In this instance, the average (e.g., pins 208a and 208b) of the pins from the two GPS devices is more accurate than either GPS device individually. In general, the average is expected to be more accurate than the GPS devices individually and is guaranteed to be more accurate than the less accurate of the two GPS devices.

When one stop identified from the GPS readings of one of the GPS devices overlaps another stop identified from the GPS readings of the other of the GPS devices in time, the two stops may be combined and/or considered as being the same stop. If more than two stops overlap, all of the overlapping stops may be combined and/or considered as the same stop. For example, a set S of stops overlap if, for any two stops s1 and sn in the set, there is a sequence of stops in S where s1 overlaps s2, s2 overlaps s3, and so on, until sn−1 overlaps sn. If these conditions are met, then the set S of stops is combined and/or considered as a single stop. As such, not all of the stops in the set S must overlap all the other stops. Instead, for each stop in the set S, each stop must overlap at least one other stop in the set S. The GPS readings from the GPS devices may be considered such that such a sequence of stops S is maximized, meaning that all potential stops are added to the sequence of stops S without invalidating the sequential, paired overlapping requirement described above. In some embodiments, the overlapping set S consists of two subsets, one comprising the stops identified by one of the GPS devices and the other comprising the stops identified by the second of the GPS devices. In some embodiments, no pair of stops in each respective subset overlap. However, if both subsets are non-empty, each stop of the first subset may overlap at least one stop of the second subset, and vice versa. The process described above identifies maximal overlapping sets of stops and builds a single consensus stop from each, as illustrated in FIG. 5.

Figure 5:
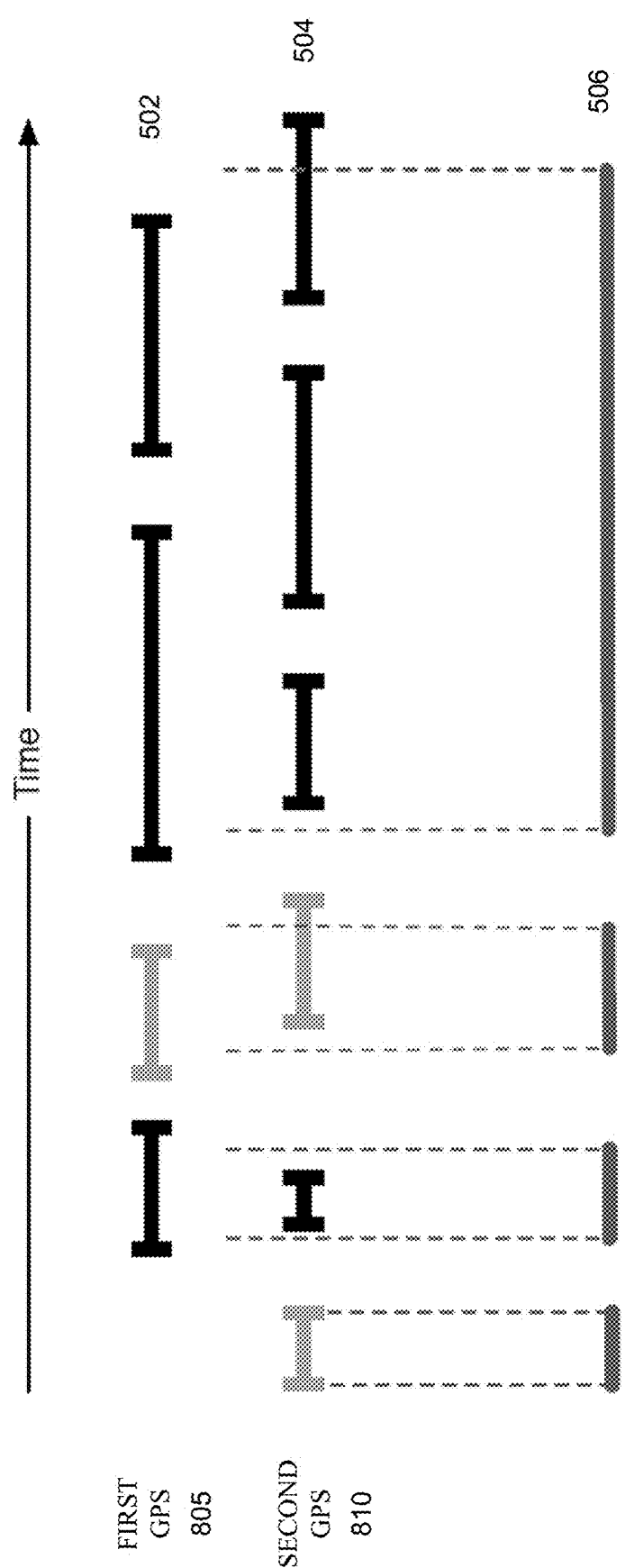
FIG. 5 is a diagram showing how the delivery system can combine overlapping sets of stops from data from the two GPS devices to generate a consensus stop.

FIG. 5 is a diagram showing how the delivery system 100 can combine overlapping sets of stops from data from the two GPS devices to generate a consensus stop. The diagram shows that, as time passes, GPS stops reported by the first GPS device 805 (top set of lines 502) and GPS stops reported by the second GPS device 810 (middle set of lines 504) can be reconciled (for example, determined to be a common stop or overlapping, if applicable). The bottom set of lines 504 shows a proposed reconciliation for the GPS stops from the first and second GPS devices 805 and 810, respectively. In each case, a common stop is constructed from a maximal set of stops that are connected by overlapping in time. Each common stop is determined by averaging the earliest arrival times from each GPS device 805 and 810, and the latest departure times from each GPS device, and the latitudes and the longitudes of stops used to build each common stop.

Various algorithms may be implemented to maximize overlapping sets of stops. In an exemplary algorithm, the delivery system 100 identifies an initial stop for the set of overlapping stops, as determined from readings from either GPS device having the earliest arrival time, for example from the GPS device 805. The delivery system 100 then monitors the second GPS device 810 to determine whether its readings identify another stop that overlaps with the initial stop. If the stops do not overlap, then the initial stop becomes a consensus stop by itself. If the stops do overlap, then the delivery system joins the initial stop and the stop identified from the second GPS device 810 that the delivery system can eventually merge into a single stop comprising the overlapping set of stops.

The delivery system 100 may implement the exemplary algorithm, which traverses the GPS readings received from each GPS device (for example, in the format of input arrays). The algorithm identifies, based on the GPS readings, the next stop from each GPS device and tests whether the next stop(s) should be included in the set of overlapping stops that is being constructed by checking the overlapping status. For example, if the next stop identified by the second GPS device 810 overlaps the last stop identified by the first GPS device 805 in the current set, the next stop identified by the second GPS device 810 is appended to the second GPS device 810 part (e.g., the line 504) of the current set, and the algorithm advances to the next stop identified by the second GPS device 810 and the process continues. Alternatively, if the stop identified by the first GPS device 805 overlaps the last stop identified by the second GPS device 805 in the current set, the stop is appended to the first GPS device 805 part (e.g., the line 502) of the current set, and the algorithm advances to the next stop identified by the first GPS device 805 and the process continues. Alternatively, when no stop identified by either GPS device overlaps the last stop identified by the other GPS device, the current set is at its maximum size and its member stops are combined into a single stop and the algorithm begins building a new set of overlapping stops.

When starting a new set of overlapping stops, the delivery system 100 may use the algorithm to determine whether the next stop from the first GPS device 805 overlaps the next stop from the second GPS device 810 (or vice versa) and, if so, place them in their corresponding subsets in the new set (represented by the line 506) and continue as described above. If the next stops do not overlap, then the algorithm may clone the stop from the GPS device having the earliest arrival time and advance to the next stop from either GPS device and continue as described above.

A consensus stop is a stop that represents a single stop for one or more combined stops as identified from GPS readings from the GPS devices. A consensus stop is constructed from a set S of one or more overlapping stops according to the following exemplary algorithm. First, the consensus algorithm determines whether one of the first GPS device subset or the second GPS device subset of stops is empty. If so, then the other subset of stops has only a single stop that does not overlap any other stop, and that single stop is returned or deemed a consensus stop for that set S of stops. Otherwise, the consensus algorithm determines a latitude of the consensus stop based on a weighted average of the latitudes of all stops in the set S of overlapping stops and determines a longitude of the consensus stop based on a weighted average of the longitudes of all stops in the set S of overlapping stops, where the weight of each latitude/longitude is the duration of each respective stop. Additionally, the consensus algorithm establishes a minimum arrival time of all stops in each of the subsets of stops from the first and second GPS devices and sets an arrival time of the consensus stop to be the average of these minimum arrival times. Similarly, the consensus algorithm establishes a maximum departure time of the consensus stop to be the average of the maximum departure times from all of the stops from each of the subsets of stops from the first GPS device and the second GPS device.

In some embodiments, the stops identified in the list of consensus stops (for example, represented by the line 506) better matches the route 102 of the delivery vehicle 110 than either the first GPS device stops or the second GPS device stops alone. Furthermore, the consensus stops may, on average, be closer to the stops along the route than the stops from either the first GPS device or the second GPS device (for example, second GPS device stops were on average 3.2 meters from their match on the route 102, first GPS device stops were 3.7 meters from their match on the route 102, and the consensus stops were 2.6 meters from their match on the route 102).

Based on the algorithms described above, the locations identified by the consensus stops are generally more accurate than the stops identified by the first GPS device 805 and/or the second GPS device 810 alone. Furthermore, the consensus stops are generally appropriate stops as compared to the scheduled route 102 when one of the two GPS devices is malfunctioning. Furthermore, the consensus algorithm automatically accounts for when the carrier leaves the delivery vehicle 110.

A consensus stop that averages others will probably be more accurate than either device individually; but it is guaranteed to be more accurate only in comparison to the less accurate device. If one device is wildly inaccurate, that will distort the average and damage the accuracy of the consensus stop.

When the carrier is performing a stop at a direct distribution delivery (DDD) point, the MDD may generate a series of stops that move away from the stopped delivery vehicle 110 (and the first GPS device 805). Averaging the locations will place the average stop away from the delivery vehicle 805. This is ameliorated to some extent by using the delivery system 100 to compute a weighted average of the locations, where the weight is the duration of the stop. This will give extra weight to the stop identified by the first GPS 805.

Sometimes, during a dismount, the carrier returns to the delivery vehicle 110 and drives off so quickly that the MDD (and the second GPS device 810) does not register a final stop before departure. Therefore the last stop identified by the MDD data (from the second GPS device 810) will have ended earlier than the stop identified from the first GPS device 805 and averaging will make the average stop appear shorter than the stop actual was.

Sometimes there is a significant difference in the clocks of the MDD (e.g., the second GPS device 810) and an XGPS (e.g., the first GPS device 805). In such a case, overlaps in time may not be accurate and trustable. This can best be resolved by programming the MDD to check synchronization with the XGPS clock and either report any discrepancy or else repair it.

GPS malfunctions can sometimes create unusually long but false stops that overlap and hide actual stops. For example, on a particular route, shortly after arriving at a mail stop the XGPS quit working for three hours. As a result, a significant portion of a remainder of the XGPS information appeared as one very long stop that overlapped many subsequent stops identified by the MDD and the second GPS device 810. The consensus stops generated by the delivery system 100 inherit such errors. In this case, the delivery system 100 could identify an error because the MDD recorded 363 stops while the XGPS saw only 27. Because the last XGPS "stop" lasted for the remainder of the trip, there were only 27 consensus stops. The delivery system 100 may ameliorate such errors by disregarding any day for which the number of stops reported by both the MDD and XGPS are not reasonably close to the number of expected stops on the route 102.

Additionally, the delivery system 100 may identify when the carrier leaves the delivery vehicle 110 by checking whether, in a set of overlapping GPS stops, all the MDD stops (e.g., from the second GPS device 810) are contained within one XGPS (e.g., from the first GPS device 805) stop.

Matching GPS Stops with Route Stops

The delivery system 100 may match GPS stops with route stops as discussed herein. In determining whether to adjust and/or how to adjust existing routes, such as the route 102, the delivery system 100 matches identified and/or tracked stops based on the GPS readings from the GPS devices of the delivery vehicle 110 to stops along the route 102. Stops identified by the GPS readings that are matched with expected stops on the route 102 then become planned stops while those that are not associated with expected stops are unplanned stops. The delivery system 100 may match a stop identified based on the GPS readings with an identity (including, for example, a type, a location, a reason, a work-content model, etc.) of a planned stop along the route 102 when the delivery system 100 matches the stop to one of the planned stops.

Since the route 102 is a sequence of expected stops $P=\{p1, p2, \ldots, pm\}$, the delivery system 100 may assume that the route 102 and details regarding the sequence of expected stops are accurate with regard to locations, sequence, and timing. Based on the GPS readings, and as described above, another sequence of locations $Q=\{q1, q2 \ldots qn\}$ is determined at which the delivery vehicle 110 and/or the carrier appears to have stopped (for example, the locations corresponding to the listing of consensus stops identified above). The sequence of consensus stops Q may differ from the expected sequence P in several ways.

First, the reported locations in the sequence Q may not be identical to those of the sequence P, for example due to the inherent inaccuracy of the GPS readings, etc., due to inaccuracies in the expected locations P in the route 102 description, or due to the delivery vehicle 110 not stopping sufficiently close to the expected location, such as when the desired location is blocked by another vehicle or other object. Second, the sequence Q may omit some locations identified in the sequence P because the delivery vehicle 110 did not stop at the expected location (for example, at traffic lights identified in the sequence P that were green, at a delivery only mailbox that received no mail that day, etc.). Finally, the sequence Q may include locations that do not appear in the sequence P (for example, caused by the delivery vehicle 110 stopping for a pedestrian, due to construction that causes delays, traffic, etc.).

In performing the analyses described herein, the delivery system 100 expects that the delivery vehicle 110 respects the sequence of planned stops identified in the sequence P. That is, the delivery vehicle 110 may stop at unforeseen places and may skip some stops, but if location A appears on the route 102 before location B, then the delivery vehicle 110 will visit location A before visiting location B.

The algorithm to match GPS stops (for example, those in the sequence Q) with the expected stops (for example, those in the sequence P), as implemented by the delivery system 100 may proceed in a piece-meal manner. For example, to compare the similarities and/or differences between each sequence, the delivery system 100 may compare individual pieces of each sequence in a corresponding fashion. For example, the delivery system 100 may match each stop of the expected stop (or attempted to be matched) with a corresponding GPS stop for all expected stops along the route 102.

Assuming that the first i−1 stops of the sequence Q are determined to correspond to the first j−1 stops of the sequence P, determining whether the qi and the pj stops match involves (for example, a matching algorithm) making one of the following determinations:

Determine that the GPS stop qi matches with the expected stop pj;

Determine that the GPS stop qi was unplanned; and

Determine that the expected stop pj was skipped for some reason.

A computational cost or impact (generally described as a "cost" herein) is assigned to each of these determinations and used (for example, based on a dynamic programming recursion applied by the delivery system 100) to identify a minimum-cost correspondence between matching GPS stops with expected stops. The respective costs may correspond to computational costs or impacts of using or ignoring information regarding GPS and route stops. For example, the dynamic programming recursion expresses the fact that the best correspondence between GPS stops and expected stops minimizes the total of the cost (or impact) of a current determination plus a least cost correspondence of the remainder of the stops.

More formally, let f(i,j) be the minimum cost of matching subsequence {q1, . . . , qi} with {p1, . . . , pj}. Then $$f(i, j) = \min \begin{cases} \text{cost of identify } q_i \text{ with } p_j & +f(i-1, j-1) \\ \text{cost of ignoring } q_i & +f(i-1, j) \\ \text{cost of ignoring } p_j & +f(i, j-1) \end{cases}$$ (Equation #1)

The best set of matches generates the value f(n,m). The computation requires progressively filling an (m+1)×(n+1) matrix of the costs f(i,j) and then working backwards to identify the correspondence. The total computation and space are both O(mn). This approach uses knowledge of how the sequence Q will follow, at least approximately, the expected sequence P. This approach also enables very fast computation of the most likely matches and also prevents errors from propagating between computations. Even if the delivery vehicle 110 goes out of sequence for part of the route 102, the algorithm will resume matching appropriately as soon as the carrier resumes the correct sequence.

The decision-making by the matching algorithm is driven by the relative costs or computational impact (for example, impact that such a decision has on further processing) of declaring a match between the GPS stop and the expected stop versus declaring the GPS stop to be unplanned versus declaring the expected stop to have been skipped.

The costs assigned to matches represent a relative "believability" of the match to which the score is assigned. A small value cost represents that the match is probably accurate (and therefore may have a small or minimal computation impact) while a high value cost suggests the match is less accurate (and therefore may have a larger computation impact than the small value cost). In general, greater knowledge of the expected stops provides for better assessment of the likelihood of a match between GPS stops and expected stops. In some embodiments, where information from the GPS devices is used in evaluating costs, the GPS information from the first and second GPS devices may be averaged. Alternatively, where one GPS device is known to be more accurate than the other, the less accurate information may be ignored and the costs may be determined or evaluated based on the more accurate GPS device alone.

In general, the overall matching cost involves aggregating costs associated with distance, heading, and any other relative factors. In some embodiments, one way to aggregate these costs is to sum them. In some embodiments, the distance costs, which are computed from latitudes and longitudes, is the only cost that is guaranteed to be available. In some embodiments, missing data will not incur a cost from the matching algorithm. For example, if a GPS stop being matched to a mail stop has no heading associated with it, there should be no penalty assessed in the corresponding cost determination.

Proximity Distance Costs

Figure 6A:
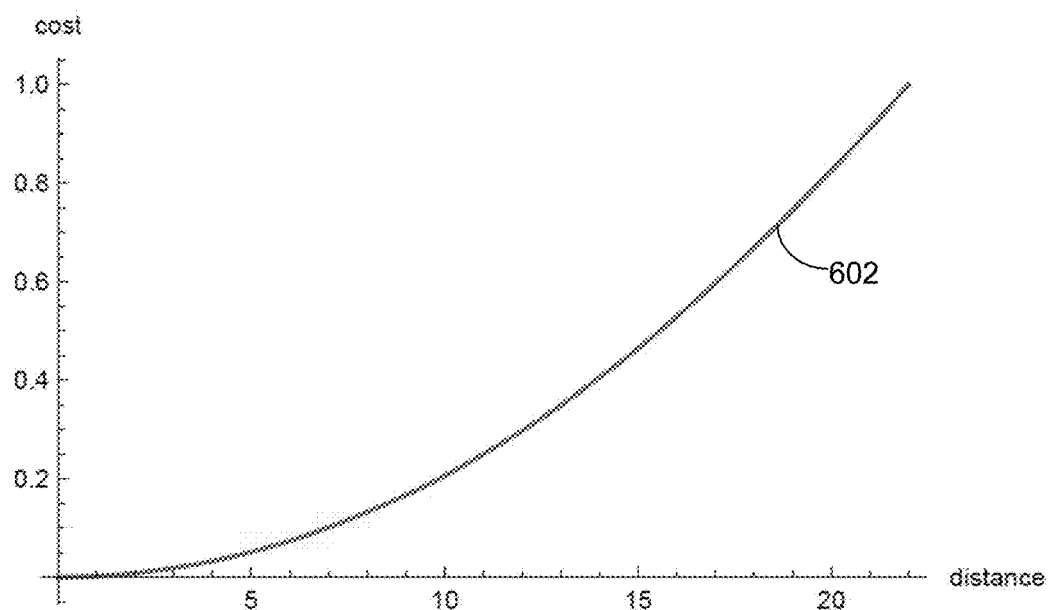
FIG. 6A is a graph showing the relationship of distance to cost of matching a GPS stop to an expected stop.

The delivery system 100 may determine proximity distance costs as discussed herein, where the proximity distance costs represent a computational impact of the proximity distance. Because of limitations on data availability, the delivery system 100 may currently measure the quality of a match between a GPS stop and an expected stop by a distance between the location information associated with each. The cost of a match decreases with the distance between the locations, which reflects the likelihood of the match, as shown in FIG. 6A, described more below. The distance between the GPS stop and the expected stop is compared to a proximity distance, which may be set at a value corresponding to a highest accuracy range for a consumer-grade GPS device. For example, the proximity distance may be set to 22.0 meters. Based on this, the cost of the distance is determined based on $$\text{cost} = \left(\frac{\text{distance in meters}}{22.0}\right)^2$$ (Equation #2)

FIG. 6A is a graph showing the relationship of distance to cost of matching a GPS stop to an expected stop. The graph shows distance along the x-axis and cost along the y-axis. The graph shows via line 602 that, as the distance increases, the cost increases at a non-linear rate. As shown, the cost (e.g., the computational impact) increases quickly once the distance exceeds the proximity cost threshold, for example set to 22.0 meters. As shown, the cost of matching a GPS Stop to an expected stop increases rapidly when the distance between them exceeds 22 meters.

In some embodiments, the delivery vehicle 110 cannot be certain to stop at the same exact location during different instances of the route 102 (for example, on different days), specifically for traffic control points or stops. For example, in a high traffic or density area, queues at traffic lights, signs, or other control points may vary day by day. Accordingly, the delivery vehicle 110 may stop at different locations or a different number of times for each traffic control point on the different days. For example, for a quick traffic light, the delivery vehicle 110 may first stop 30 meters away from the traffic light, resume travel when the traffic light has changed, and then again stop 5 meters away from the traffic light before finally resuming travel and passing the traffic light. Similar occurrences can be expected for various types of traffic signals (for example, traffic lights, railroad crossings, school crossings, drawbridges, stop signs, etc.). In such instances, the distance penalty may be reduced between GPS stops and expected stops. Accordingly, when the expected stop is a traffic control point that is determined to be variable day-by-day, the distance between the GPS stop and the expected stop locations is first divided by a deflation factor (for example, set to 2.0), which has an effect of doubling an area or distance within which a match can be declared. Thus, the cost of the distance matching is adjusted to compensate for traffic control point variations.

Proximity Heading Costs

The delivery system 100 may determine proximity heading costs as discussed herein, where the proximity heading costs represent a computational impact of the proximity distance. In some embodiments, expected stops along the route 102 have headings associated with them. For example, curbside mailboxes have associated headings that would be expected of any vehicle stopped at that location. The heading inferred from the GPS stop is compared with the heading at the expected stop. However, when the stop has no well-defined heading, no heading may be provided for that stop and no cost will be assigned to any corresponding heading difference. Generally, headings of stops are derived values and may be less reliable than measured latitudes and longitudes. Accordingly, differences between the GPS stop headings and the expected stop headings are not penalized as much as the distances between the stops, described above. The heading difference between the GPS stop and the expected stop is first determined. When the heading difference is a positive value in the range [0,180), the heading cost is determined based on $$\text{cost} = \left(\frac{\text{difference in heading}}{130.0}\right)^2 \quad \text{(Equation \#3)}$$

Figure 6B:
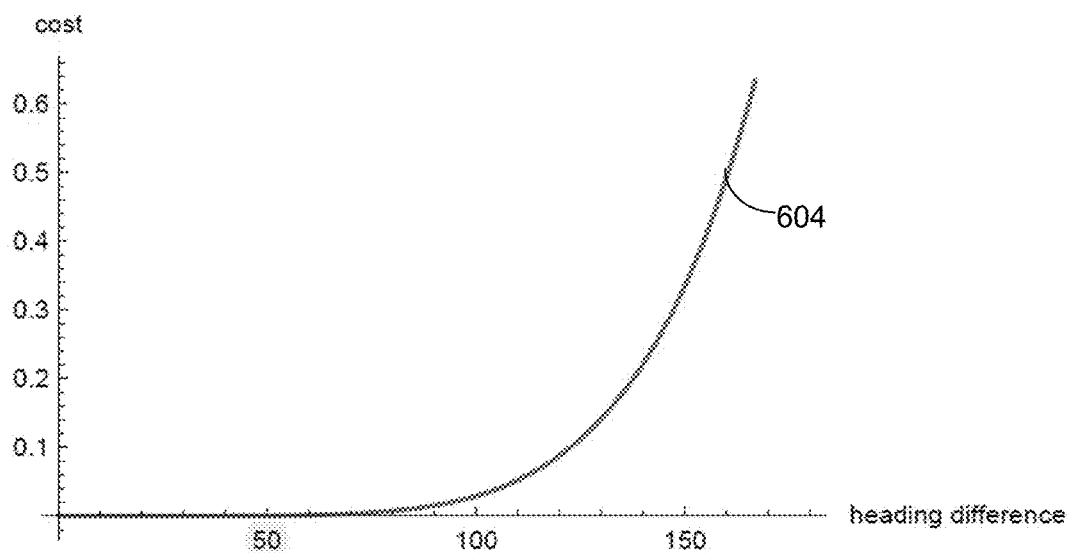
FIG. 6B is a graph showing the relationship of difference in heading to cost of matching a GPS stop to an expected stop.

FIG. 6B is a graph showing the relationship of difference in heading to cost of matching a GPS stop to an expected stop. The graph shows a heading difference (in degrees) along the x-axis and cost along the y-axis. The line 604 on the graph shows that, as the heading difference increases, the cost increases at a non-linear rate. As shown, the cost increases more quickly once the heading difference exceeds approximately 120-degrees as compared to heading differences of less than approximately 120-degrees.

Incorporating Other Information

Accurate scoring distinctions by the delivery system 100 based on matching algorithm may utilize matching costs that are extended or specialized to include other information about the expected stop. For example, in the expected stops, additional information about an expected duration of the stop may be known. For example, if a particular expected stop is a mail stop that serves many addresses, the duration of the expected stop is expected to be longer. Accordingly, the matching algorithm may utilize models or computations that penalize a match if a duration of the corresponding GPS stop is much shorter than the expected duration.

The default model or computation assigns a constant 4.0 as a shortest time required for a dismount by the driver of the delivery vehicle 110. In some embodiments, a dismount is expected at any mailstop that is not indicated in the predicted stop information as being a curbside stop or as particular traffic control points. Similarly, a constant of 1.0 is assigned as a shortest time required to serve an address without dismounting the delivery vehicle 110. Accordingly, a lower bound on service time can be estimated by multiplying the number of stops served at the stop times 1.0 by 1.0 and adding this amount to any dismount times, determined by multiplying the number of stops served at the stop times 4.0 by 4.0. One way to penalize mismatches is to compute the ratio of the lower bound on expected stop times (dismount time plus service time) divided by an observed time of the stop. The cost of accepting this match is the ratio if the ratio exceeds 1.5, and zero otherwise. Such conditions will prevent the matching algorithms from matching GPS stops of brief duration to expected stops that are expected to require more time (for example, longer durations).

Costs of Unplanned Stops

Unexpected stops will be identified by the delivery system 100 based on the GPS readings, especially when the delivery vehicle 110 travels on busy roads. The costs of unplanned stops relate to computational impacts that the unplanned stop matching or not matching with an expected stop has on further processing. Therefore, the cost of ignoring a GPS stop that does not match well with one of the expected stops of the sequence of expected stops along the route 102 should be smaller than the cost of skipping an expected stop. In some embodiments, the cost of an unexpected stop is set to 0.9, or a smaller value. In some embodiments, the on a segment of the route 102 that is known or expected to have dense traffic and which is, accordingly, expected to result in more unplanned stops.

Costs of Skipping Expected Stops

In general, the cost to skip an unplanned stop is 1.0. The costs of skipping expected stops relate to computational impacts skipping the expected stop has on further processing. However, this cost may be reduced for a planned stop that might not be required, such as at a stop light. In addition, there are some stops that are almost certain to be visited, such as a stop at a mail collection box. To account for these variations, the costs for skipping expected stops may be established according to Table 1.

| TYPE | SUBTYPE | PENALTY |
| --- | --- | --- |
| TCP | YLD, FS, DR, RR, SZ | 0.0 |
| | TL | 0.3 |
| | SS | 0.5 |
| | TR, AG | 0.6 |
| | CB | 3.0 |
| | ELSE: | 1.0 |
| MS | B, C, H | 3.0 |
| | ELSE | NUMBER OF ADDRESSES × 1.0 |
| ELSE | | 1.0 |

Additionally, the matching algorithm may assign costs of skipping an aggregate stop equal to a sum of the costs of skipping each individual stop within the aggregate stop. Thus, if a planned stop serves ten addresses, the cost of leaving this stop unmatched is ten times the cost of leaving unmatched a stop that serves a single address.

The matching algorithm described herein (as applied by the delivery system 100) will operate appropriately even if the delivery vehicle 110 violates the expected sequence of stops, as long as the violation is not extreme (for example, as long as the delivery vehicle does not change the sequence in a manner such as reversing the entire route 102). Thus, for example, if the route 102 presents stops in the sequence A-B-C-D but the delivery vehicle 110 visits the stops in the sequence A-C-B-D, the matching algorithm will report either A-C-D or else A-B-D, depending on whether C or B is a better match to the corresponding GPS stop, identifying the missing stop as being a skipped stop and identifying the travel time from A to C or from B to D, respectively, as being unusually long. Presumably, the missed stop will be an outlier in the data and, therefore be recognizable. Similarly, if the delivery vehicle 110 deviates, say to complete an express delivery, after visiting locations A-B and then returns to visit C-D, the only effect will be that the travel time from B to C will appear unusually large. Besides being an outlier, this reading would be ignored anyway because the travel from B to C would appear to have been interrupted by one or more unplanned stops.

Estimating Segment Transition Times

After the matching algorithm matches the GPS stops to the expected stops along the route 102, an estimating algorithm (as may be applied by the delivery system 100) searches the list of GPS stops to find the last matched stop on the current segment i (for example, a matched stop$_j$) and assume the delivery vehicle 110 departed the location of the stop $j$ location at a time $t_j$. The estimating algorithm then searches forward in the list of GPS stops to find the next matched stop stop$_j$+1. The stop stop$_j$+1 will appear on a different segment k. Assume that the delivery vehicle 110 arrived at the stop stop$_j$+1 at a time $t_j$+1. Sometime within the interval [$t_j,t_j$+1], the delivery vehicle 110 must have exited segment i and any segments between i and k before entering the segment k. Next, the GPS readings from the delivery vehicle 110 GPS devices, which are time-stamped, are searched within the interval [$t_j,t_j$+1] to find those GPS readings that are closest to the endpoints of the segment i and the segments between segments i and k, subject to the condition that the reported heading of the last GPS stop be within 90 degrees of the heading associated with the endpoint of the segment.

For example, the estimating algorithm may assume that each of the segments i,i+1, . . . , k−1 (for example, each of the segments between segment i and segment k not including k) has a distinct GPS reading that is the current incumbent for the closest GPS reading to the end point of the respective segment. Because the delivery vehicle 110 is assumed to travel segment i before segment i+1, the estimating algorithm may determine that the timestamp of the GPS reading that is closest to segment i be no later than the timestamp of the GPS reading that is closest to segment i+1. Similarly, the timestamp of the GPS reading that is closest to segment i+1 cannot be later than the timestamp of the GPS reading that is closest to segment i+2. Now if the next GPS reading is closer to the end point of segment i than the current incumbent GPS reading, then the next GPS reading becomes the incumbent GPS reading for segment i and all subsequent segments i+1, . . . , k−1. If the next GPS reading is closer to the end point of segment i than the current incumbent, then it becomes the incumbent for segment i and all subsequent segments i+1, . . . , k−1. Otherwise, the estimating algorithm checks whether the GPS reading is closer to the end point of segment i+1 than the current incumbent and of acceptable heading. If so, the checked GPS reading is set as the new incumbent for downstream segments i+2, . . . , k−1. Otherwise, the estimating algorithm checks whether the checked GPS reading is closer to the end point of segment i+2 than the current incumbent, and so on.

Estimating times associated with the segment transitions is the least reliable operation based on the information from the GPS readings. This is because the least evidence is available regarding the corresponding times because a single GPS reading (the one that is closest for each segment) is the basis for all determined information, and this single GPS reading could be an outlier. In contrast, identifying stops involves greater confidences because stops are determined based on multiple readings, reducing an impact of an outlier GPS reading should one happen to be used in the determination.

Deviations in travel or gaps in GPS readings may invalidate or defeat determination of any segment transition between the last-visited planned stop and the next. In general, segment transitions between segments that contain matched stops involve greater confidences than those that do not contain matched stops. For example, if there are several consecutive segments that contain no matched stops, estimates of segment transition times between these consecutive segments could be incorrect, especially if the delivery vehicle 110 fails to travel the segments in sequence.

Timeline Construction

Based on the determinations described herein, the delivery system 100 may establish a timeline corresponding to the route 102. Each stop generally corresponds to two events (an arrival at a certain location and a time $t_i$, and a departure at a later time $t_i$+1). Each transition from one segment to the next is a single event that occurs starting at a certain location at a time t. Segment transitions may not occur while the delivery vehicle 110 is stopped, so either t≤$t_i$ or else $t_i$+1≤t. If successive GPS stops occur during intervals [$t_i,t_i$+1] and [$t_i$+2,$t_i$+3] then the intervening interval [$t_i$+1,$t_i$+2] is assumed to be one of travel (for example, a segment transition). Each event (for example, a stop, a transition, etc.) has an associated timestamp and location. The location may have an identity if it was matched with an expected stop by the matching algorithm described above or it may have, simply, a latitude and longitude as derived in a manner as described above. Since each event includes a timestamp, the timeline can be constructed, for example, by sorting the events in a chronological order. This timeline may summarize everything known about the traversal of the route 102 one a particular day. The timeline provides an aggregation of data from which the duration of every stop as well as the travel time between stops may be determined.

In some embodiments, there may be gaps in the stream of GPS readings from one or more of the GPS devices. One type of gap is a simple failure of the GPS device to generate a reading (either the GPS device not transmitting a reading or the receiving device (for example, the vehicle location management component 200) not recording a received GPS reading. Such gaps are recognizable by a gap or break in the recorded times. The recorded times should be regular (every second, for example, for the second GPS device and every 0.1 seconds for the first GPS device). Gaps can also arise in the stream of GPS readings when flawed GPS readings are filtered out of the stream. A GPS reading is considered flawed, for example, if the NMEA sentence" does not match its checksum (field 12 of the GPRMC sentence) or if the NMEA sentence identifies the reading as invalid (field 2 of the GPRMC sentence).

The matching algorithm described herein will still work even if there are gaps in the GPS stream of readings. As soon as the stream of readings is re-established, the matching algorithm will resume associating GPS stops with expected stops. The gaps will be blind spots and may cause a reduction in confidence levels in interpretation of the delivery vehicle 110 during the gaps.

For an interval to be valid, the two GPS devices must agree that there are no intervening events, unless the first GPS device identifies a stop as requiring a dismount and the second GPS device leaves the location of the delivery vehicle 110. Events that are not trustworthy are eliminated and/or filtered from the timeline and/or other aggregated data according to the elimination algorithm described below.

First, each set of GPS readings (for example, from each GPS device) is parsed to identify significant gaps. Any travel interval that is determined to contain a significant gap is marked or flagged. Similarly, any travel interval that is adjacent to a segment transition that is "too far from" an expected location is marked or flagged (for example, if the travel interval is greater than 20 meters from the expected location). For each scan of an item being delivered, the elimination algorithm may identify and save or note a corresponding time and find the travel interval containing that scan. If the containing interval is a travel interval, that interval is marked or flagged because all scans should occur when the delivery vehicle 110 is paused. If the containing interval is a stop interval, then the elimination algorithm confirms whether the stop is sufficiently close to the expected stop (for example, a mailstop or a park point) associated with the address served by that scan. If not, the elimination algorithm marks or flags the containing interval.

The elimination algorithm then determines or identifies all marked or flagged intervals as being "untrustworthy". Any intervals that are not flagged or marked are determined or identified as being trustworthy and to be included in the model described herein. However, all stops will be saved, even if unrecognized or flagged as being untrustworthy. These stops can be used to check and correct the route 102 description, fine-tune costs (e.g., computational impacts) in the matching algorithm, and possibly identify stops that are not but should be planned.

Improving Route Descriptions

The various algorithms and procedures described herein and applied or implemented by the delivery system 100 may leave some GPS stops unmatched and, therefore, unidentified. This may occur because there existed stops that could not be anticipated, such as when the delivery vehicle 110 must wait behind another vehicle trying to make a left turn across traffic. But unidentified stops might also describe actual stops for item delivery or traffic control that are missing from the route 102 description or else incorrectly located or incorrectly sequenced. By flagging and identifying daily stops, unplanned stops that should be in the route 102 description can be better determined and identified. By such collection of regular, unplanned stops (regular in time, duration, location, etc.) the route 102 can be updated to account for the common or regular stops. In some embodiments, the unplanned stops are collected over some time period, for example, one week, two weeks, one month, two months, and so forth, identifying where clusters of the unplanned stops occur. Assuming that a cluster represents a history of stops at one location, a general location for the cluster of unplanned stopped can be determined (for example, by averaging the latitudes, longitudes, and headings of each of the stops in the cluster of unplanned stops). Furthermore, the density of each cluster may be deterministic of a frequency with which the delivery vehicle 110 stops at the corresponding location. For example, a clustering algorithm (for example, DBSCAN) can be programmed to this and identifies clusters based on density. The clustering algorithm partitions the points (corresponding to the unplanned stops) into disjoint clusters plus outliers. In some embodiments, each unvisited point p is considered, along with all points with a distance ε. If there are more than a minimum number of points within the distance ε, all those points are assigned to the same cluster as the point p, unless they are already assigned elsewhere. In some embodiments, c is equal to 3 meters, for example when searching for mail stops at curbside mailboxes. In some embodiments, 3 meters represents the accuracy of the GPS device(s) under ideal conditions and may be necessary to separate readings from nearby mail stops. The minimum number of points may be determined based on how many days' worth of data are being analyzed. For example, if there are 50 days' worth of data, then for any specific park point, the two GPS devices of the delivery vehicle 110 are expected to generate about 100 GPS stops (50 per device) if the delivery vehicle 110 stopped at that specific park point every day. To allow for GPS reading inaccuracy or times when the carrier parked nearby or skipped the stop altogether, the minimum number of points should be set to, for example, 0.25 times 100. The resulting clusters will likely represent frequent stops at a single location, as in FIG. 7. Setting the minimum number of points to a smaller value will enable the clustering algorithm to identify smaller clusters that may represent stops that are visited less frequently.

A representative point can be constructed for each cluster by averaging the latitudes and longitudes of all points in the cluster and the representative point may be taken as the 'true" stop. However, suppose that the route 102 description omitted two nearby mail stops. Each mail stop would generate a cluster of unplanned stops, which, if they overlap sufficiently, may be interpreted by the clustering algorithm as a single "cloud", which would result in a single representative point midway between the two actual mail stops. In such cases, it may be impossible to tell from a single map alone the reason for the stop (for example, that the single stop instead involves two stops). In some embodiments, such ambiguity is programmatically reduced by making use of additional information, for example, by separating out unplanned stops by segment and analyzing them segment-by-segment. This would separate the clusters surrounding two nearby stops that are directly across the street from each other. It may not be possible to programmatically separate all clusters, for example, clusters that surround two nearby mail stops on the same segment or within a cul-de-sac. Nevertheless, any cluster indicates at least one stop that should be examined. In some embodiments, the clustering algorithm may be modified or adapted to determine that two points can be considered to be in the same cluster only if the two points satisfy the usual requirements (described above) but also have similar headings (for example, have headings do not differ by more than 90 degrees).

Figure 7:
FIG. 7 is a map showing clusters of points indicating stops along the route which, in some embodiments, are determined using the processes described elsewhere herein.

FIG. 7 is a map showing clusters of points indicating stops along the route which, in some embodiments, are determined using the processes described elsewhere herein. Each point on the map represents an stop along, for example, the route 102. Each shaded point (for example, identified by points 702) represents a cluster of points representing unexpected stops with a density that exceeds a threshold (for example, 80 members within a 5 meter radius) over a number of days (for example, 50 or less) and shows where the delivery vehicle 110 stopped nearly every day. That such frequent stops were unplanned suggests errors or omissions in the route 102 and/or its description. The other black spots along the route represent stops that are expected.

Figure 8:
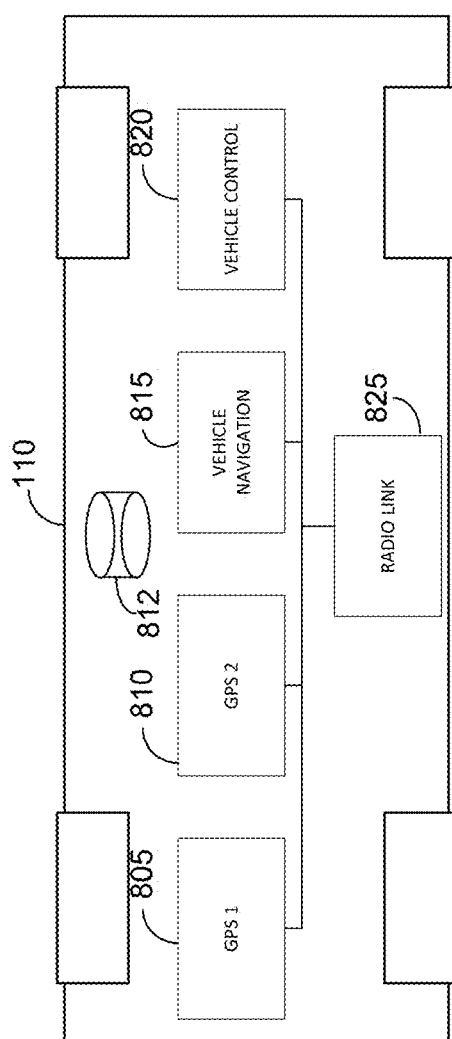
FIG. 8 is a block diagram of an exemplary delivery vehicle.

FIG. 8 is a block diagram of an exemplary delivery vehicle. The delivery vehicle 110 shown in FIG. 8 may be an exemplary embodiment of the delivery vehicles 110a-b shown in FIG. 1. The exemplary delivery vehicle 110 includes a first global positioning system (GPS) receiver 805, a second GPS receiver 810, a vehicle navigation component 815, a vehicle control component 820, and a radio link 825. The radio link 825 may enable one or more of the first GPS receiver 805, second GPS receiver 810, vehicle navigation component 815, or vehicle control component 820 to communicate wirelessly with other components of the disclosed methods and systems, such as any of the components shown in FIG. 2.

The first GPS receiver 805 and second GPS receiver 810 may receive GPS signals from GPS satellites to determine a position of the delivery vehicle 110. This information may be reported, via the radio link provided via radio link component 825, to for example, the vehicle location management component 220 in some aspects. This may enable the disclosed methods and systems to maintain a current record of a location, heading, speed, etc., of the delivery vehicle 110, and of multiple delivery vehicles 110 managed by the delivery system, such that the delivery system is able to monitor and/or adjust routes 102 as necessary to improve efficiencies.

The vehicle navigation component 815 may control navigation of the delivery vehicle 110 along a route. Route information may be retrieved from the route database 812. In some aspects, the vehicle navigation component 815 may receive route updates via the radio link 825, from, for example, the vehicle route control component 230, illustrated with respect to FIG. 2. The vehicle navigation component 815 may provide instructions to the vehicle control component 820. For example, the vehicle navigation component 815 may send commands such as a command to turn the delivery vehicle 110 to a particular heading, stop the delivery vehicle 110, or drive the delivery vehicle 110 at a particular speed to the vehicle control component 820.

The vehicle control component 820 may provide autonomous, electronic control of the delivery vehicle 110 in some aspects. As discussed above, the vehicle control component 820 may receive commands such as a command to turn to a particular heading, stop, or drive at a particular speed from a vehicle navigation component. The vehicle control component 820 may maintain electronic interfaces with vehicle systems, such as braking systems, engine systems, and steering systems (not shown in FIG. 8) that can affect the commands received from the vehicle navigation component. In aspects of the delivery vehicle 110 that may be manually controlled by a human operator, the vehicle control component 820 may function to display instructions to the human operator to effect particular routes. For example, upon receiving a command to move the vehicle to a particular address, the vehicle control component may display the address on a display screen of the vehicle, such that the human operator can read the display screen and drive the vehicle to the address. In some aspects, the human operator may be assisted by a navigation application that provides route information to the commanded address.

Figure 9:
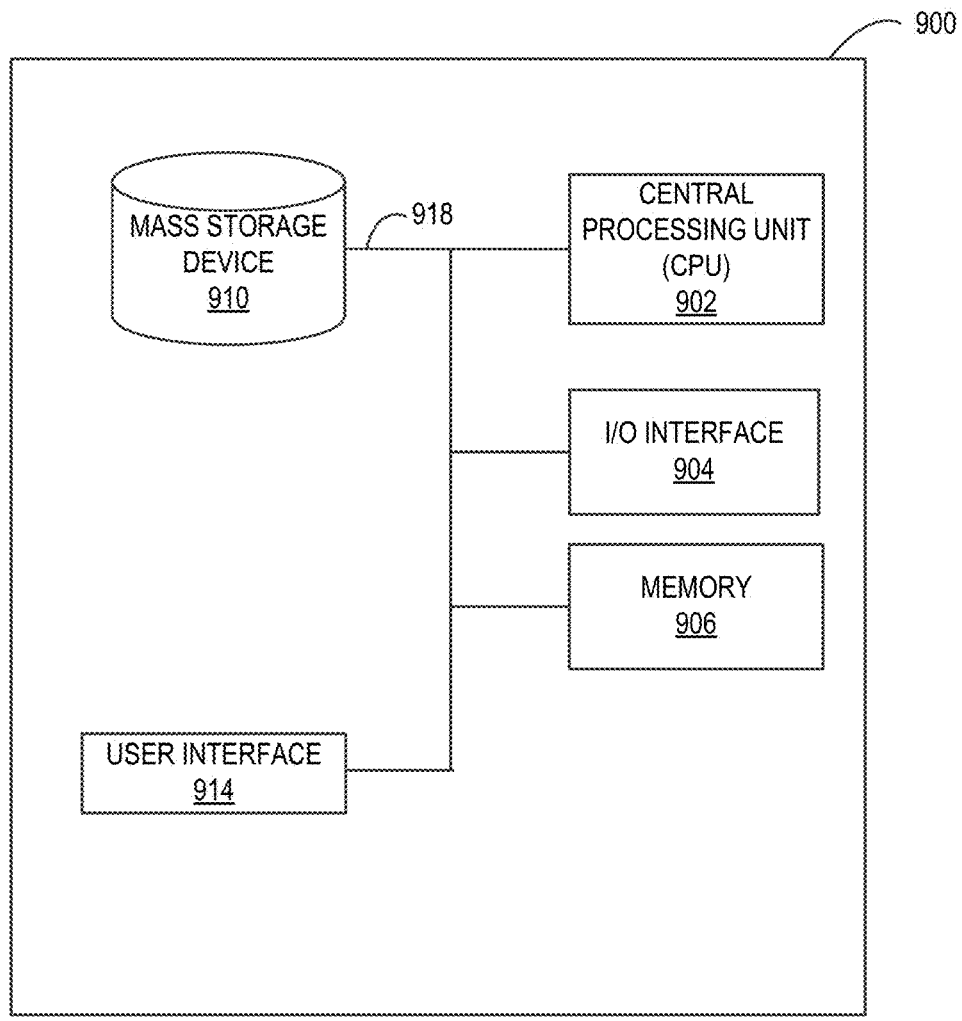
FIG. 9 is a block diagram corresponding to an aspect of a hardware and/or software component as an example embodiment of the delivery system of FIG. 2.

FIG. 9 is a block diagram 900 corresponding to an aspect of a hardware and/or software component as an example embodiment of the delivery system 100 of FIG. 2. The hardware and/or software components, as discussed below with reference to the block diagram 900 may be included in any of the devices of the delivery system 100 (for example, the route management component 205, the route cost management component 240, the vehicle control component 230, the vehicle location management component 220, and so forth). These various depicted components of the block diagram 900 may be used to implement the systems and methods described herein.

In some embodiments, certain modules described below, such as the user interface module 914, may be included with, performed by, or distributed among different and/or multiple components of the delivery system 100. For example, certain user interface functionality described herein may be performed by the user interface module 914 of various components.

In some embodiments, the various modules described herein may be implemented by either hardware or software. In an embodiment, various software modules included in the delivery system 100 may be stored on a component of the delivery store 100 itself (for example, a local memory 906 or a mass storage device 910), or on computer readable storage media or other component separate from the delivery system 100 and in communication with the delivery system 100 via a network or other appropriate means.

The CPU 902 may control operation of the delivery system 100. The CPU 902 may also be referred to as a processor. The processor 902 may comprise or be a component of a processing system implemented with one or more processors. The one or more processors may be implemented with any combination of general-purpose microprocessors, microcontrollers, digital signal processors ("DSPs"), field programmable gate array ("FPGAs"), programmable logic devices ("PLDs"), controllers, state machines, gated logic, discrete hardware components, dedicated hardware finite state machines, or any other suitable entities that can perform calculations or other manipulations of information.

The I/O interface 904 may comprise a keypad, a microphone, a touchpad, a speaker, and/or a display, or any other commonly available input/output ("I/O") devices and interfaces. The I/O interface 904 may include any element or component that conveys information to the user of the delivery system 100 (for example, a carrier, a carrier manager, and so forth) and/or receives input from the user. In one embodiment, the I/O interface 904 includes one or more display devices, such as a monitor, that allows the visual presentation of data to the consumer. More particularly, the display device provides for the presentation of GUIs, application software data, websites, web apps, and multimedia presentations, for example. In some embodiments, the I/O interface 904 may present one or more maps, reports, graphs, or images as described above, for example one or more of the map of FIG. 4, the graphs of FIGS. 6A and 6B, or the map of stops of FIG. 7.

In some embodiments, the I/O interface 904 may provide a communication interface to various external devices. For example, the delivery system 100 is electronically coupled to the network and/or the GPS devices of the delivery vehicles 110, which comprises one or more of a LAN, WAN, and/or the Internet or other wired or wireless connection. Accordingly, the I/O interface 904 includes an interface allowing for communication with the network and/or other devices, for example, via a wired communication port, a wireless communication port, or combination thereof. The network may allow various computing devices and/or other electronic devices to communicate with each other via wired or wireless communication links.

The memory 906, which includes one or both of read-only memory (ROM) and random access memory ("RAM"), may provide instructions and data to the processor 902. For example, data received via inputs received by one or more components of the delivery system 100 may be stored in the memory 906. A portion of the memory 906 may also include non-volatile random access memory ("NVRAM"). The processor 902 typically performs logical and arithmetic operations based on program instructions stored within the memory 906. The instructions in the memory 906 may be executable to implement the methods described herein. In some embodiments, the memory 906 may be configured as a database and may store information that is received via the user interface module 914 or the I/O interfaces and devices 904. In some embodiments, the memory 906 may store one or more of the algorithms described herein while being implemented or applied by the delivery system 100, for example with the processor 902.

The block diagram 900 may also include the mass storage device 910 for storing software or information (for example, the algorithms described herein when not being applied or other instructions for the processor 902 to perform the analysis and/or processing described herein), and so forth. Software shall be construed broadly to mean any type of instructions, whether referred to as software, firmware, middleware, microcode, hardware description language, or otherwise. Instructions may include code (for example, in source code format, binary code format, executable code format, or any other suitable format of code). The instructions, when executed by the one or more processors, cause the processing system to perform the various functions described herein. Accordingly, the delivery system 100 may include, for example, hardware, firmware, and software, or any combination therein. The mass storage device 910 may comprise a hard drive, diskette, solid state drive, or optical media storage device. In some embodiments, the mass storage device 910 may be structured such that the data stored therein is easily manipulated and parsed.

The block diagram 900 also includes the user interface module 914. In some embodiments, the user interface module 914 may also be stored in the mass storage device 910 as executable software code that is executed by the processor 902. In the embodiment shown in FIG. 9, the delivery system 100 may be configured to execute the user interface module 914 to perform the various methods and/or processes as described herein.

The user interface module 914 may be configured to generate and/or operate user interfaces of various types. In some embodiments, the user interface module 914 constructs pages, applications or displays to be displayed in a web browser or computer/mobile application. In some embodiments, the user interface module 914 may provide an application or similar module for download and operation by the processor 902, through which the user may interface with the delivery system 100 to obtain any desired report or output. The pages or displays may, in some embodiments, be specific to a type of device, such as a mobile device or a desktop web browser, to maximize usability for the particular device. In some embodiments, the user interface module 914 may also interact with a client-side application, such as a mobile phone application, a standalone desktop application, or user communication accounts (for example, e-mail, SMS messaging, and so forth) and provide data as necessary.

The various components of the delivery system 100 and/or the block diagram 900 may be coupled together by a bus system 918. The bus system 918 may include a data bus, for example, as well as a power bus, a control signal bus, and a status signal bus in addition to the data bus. In different embodiments, the bus could be implemented in Peripheral Component Interconnect ("PCP"), Microchannel, Small Computer System Interface ("SCSI"), Industrial Standard Architecture ("ISA") and Extended ISA ("EISA") architectures, for example. In addition, the functionality provided for in the components and modules of the delivery system 100 may be combined into fewer components and modules or further separated into additional components and modules than that shown in FIG. 9.

Figure 10:
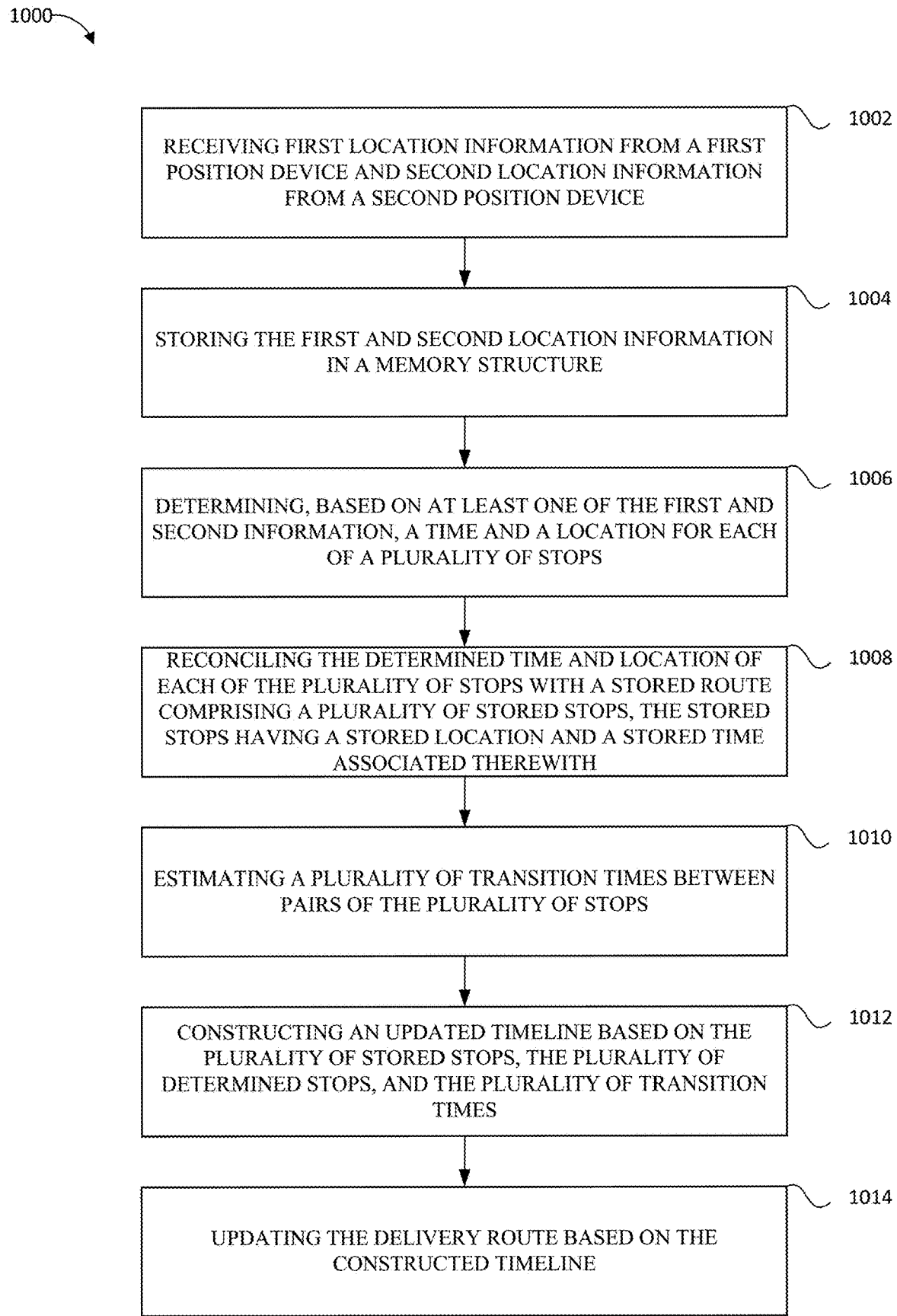
FIG. 10 is a flowchart of an example method of augmenting information for a delivery route, for example using the delivery system of FIG. 2.

FIG. 10 is a flowchart of an example method 1000 of augmenting information for a delivery route, for example using the delivery system of FIG. 2. Specifically, FIG. 10 depicts an illustrative method for implementing aspects of the present disclosure. The method 1000 includes various blocks used to receive information from multiple sources, process the received information as described herein to identify stops and corresponding information, and compare the received information with expected information to determine whether the existing routes need to be modified based on the received information. Methods similar to method 1000 may be run simultaneously, in an overlapping manner, or sequentially based on inputs or requests from multiple delivery vehicles 110 that are each accessing the delivery system 100. The various blocks of the method 1000 may be performed by one or more components of the delivery system 100 as described in relation to FIGS. 2 and 9. For example, one or more blocks of the method 100 may be performed by the processor 902. In some embodiments, one or more of the blocks of the method 1000 are implemented by one or more of the components of the delivery system 100, as referenced in FIG. 2. In some embodiments, the blocks of the method 1000 are performed in a sequential manner, while in other embodiments, the blocks of the method 1000 may be performed in a non-sequential manner, regardless of the terminology used to describe the method 1000 herein. A person having ordinary skill in the art will appreciate that the method 1000 may be implemented by other suitable devices and systems. Although the method 1000 is described herein with reference to a particular order, in various aspects, blocks herein may be performed in a different order, or omitted, and additional blocks may be added.

As shown at block 1002, the method 1000 may comprise receiving first location information from a first position device (for example, the first GPS device 805) and receiving second location information from a second position device (for example, the second GPS device 810). In some embodiments, the first and second location information may comprise one or more of location data and time data.

At block 1004, the received first and second location information is stored, for example by the processor 902, in a memory structure, for example the memory 906 or the mass storage device 910 of FIG. 9. In some embodiments, the stored first and second location information is first processed to smooth the received information.

At block 1006, the processor 902, for example, determines, based on at least one of the first and second information, a time and a location for individual stops of a plurality of stops. In some embodiments, the processor 902 further determines stops from analyzing differences, etc., between one or more of the time data and the location data in the first location information and the second location information, as described herein.

At block 1008, the determined time and location for the individual stops is compared and/or reconciled with stops for a stored route, the stored route comprising a plurality of stored stops having stored location and stored time information associated therewith. For example, the stored route may include expected stops, where the expected stops identify a location where a carrier servicing the route is expected to stop and a time at which the carrier is expected at the stop. In some embodiments, the time may be specific time of the day or a duration after a previous one or more expected stops on the stored route.

At block 1010, the processor 902, for example, estimates a plurality of transition times between pairs of the plurality of stops. The transition times may comprise the amount of time required for the carrier to travel between stops, consecutive or otherwise. In some embodiments, the estimates for the transition times may be based on one or more sets of first and second information, where each set of first and second information is received on a different day. As such, the estimates for the transition times may be an average of multiple transition times as determined based on the carrier servicing the route over a number of days.

At block 1012, the method 1000 comprises constructing an updated timeline based on the plurality of stored stops, the plurality of determined stops, and the plurality of transition times. Constructing an updated timeline may generally comprise constructing an update route based on the first and second information. For example, the processor 902 may identify the times at which the carrier reached each determined stop as determined based on the first and second information. These times may be times of the day or relative to previous stops for the carrier. In some embodiments, the constructing of the updated timeline is performed as described herein. As such, the processor 902 may identify the timeline for the stored route, which includes the transition times between expected stops and times at which the carrier is expected at the expected stops. Using the first and second information, the processor 902 can determine whether real-world conditions make the stored route and its timeline improper or inaccurate. For example, traffic developments, new construction, and so forth, can impact or change travel times between stops. The processor 902 accounts for such changes over time, etc., by constructing an updated timeline based on the time transition times estimated based on the received first and second information. At block 1014, the method 1000 then updates the stored delivery route based on the constructed or updated timeline. Thus, the stored route indicates appropriate transition times and/or appropriate expected times at which the carrier should be at the expected stops. By updating the stored route, the carrier grades, etc., determined based on comparing the carrier routes with the stored routes are improved to help the carrier's performance of the route better match the expected route.

Additional Embodiments

Those of skill will recognize that the various illustrative logical blocks, modules, circuits, and algorithm steps described as follows, and in connection with the embodiments disclosed herein may be implemented as electronic hardware, software stored on a computer readable medium and executable by a hardware processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX®, MacOS® or Microsoft Windows®.

The system control may be written in any conventional programming language such as C, C++, BASIC, Pascal, .NET (e.g., C #), or Java, and ran under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

As will be understood by those of skill in the art, in some embodiments, the processes set forth in the following material may be performed on a computer network. The computer network having a central server, the central server having a processor, data storage, such as databases and memories, and communications features to allow wired or wireless communication with various parts of the networks, including terminals and any other desired network access point or means.

What is claimed is:

1. A method of augmenting a delivery route, the method comprising:
   receiving first location information from a first global positioning system (GPS) device, the first GPS device being integrated into a mobile computing device;
   receiving second location information from a second GPS device, the second GPS device being integrated into a delivery vehicle;
   storing the first and second location information in a memory structure;
   determining, based on at least one of the first and second information, a time and a location for each of a plurality of stops;
   reconciling the determined time and location of each of the plurality of stops with a stored route comprising a plurality of stored stops, the stored stops having a stored location and a stored time associated therewith, wherein reconciling the determined time and location of each of the plurality of stops with the stored route comprises identifying a planned stop when the time and location of one of the plurality of stops is associated with a time and location of a corresponding one of the plurality of stored stops, identifying an unplanned stop when neither the time and location of one of the plurality of stops is associated with the time and location of any of the stored stops;
   estimating a plurality of transition times between pairs of the plurality of stops;
   constructing an updated timeline based on the plurality of stored stops, the plurality of determined stops, and the plurality of transition times; and
   updating the delivery route based on the constructed timeline.

2. The method of claim 1, wherein storing the first and second location information in a memory structure comprises smoothing location, heading, and speed information of the first and second location information to reduce inaccuracies.

3. The method of claim 1, wherein determining the time and location for each of the plurality of stops comprises at least one of identifying overlapping time and location information from the first and second location information and identifying time and location information from only one of the first and second location information.

4. The method of claim 1, wherein reconciling the determined time and location of each of the plurality of stops with the stored route further comprises identifying a skipped planned stop when the location of one of the plurality of stops is associated with the location of one of the stored stops but the time of the one of the plurality of stops is not associated with the corresponding time of the one of the stored stops and when a location of another of the stored stops does not have an associated location of another one of the plurality of stops.

5. The method of claim 1, further comprising assigning a computational cost to each of the planned stops, the unplanned stops, and the skipped stops.

6. A system for augmenting a delivery route, the system comprising:
a hardware processor configured to:
receive first location information from a first GPS device the first GPS device being integrated into a mobile computing device; and
receive second location information from a second GPS device, the second GPS device being integrated into a delivery vehicle;
a data store configured to store location information and information regarding a route comprising a plurality of expected stops and an expected timeline; and
a computing device comprising a processor and a memory and configured to execute computer-executable instructions in order to:
store the first and second location information in the data store,
determine, based on at least one of the first and second information, a time and a location for individual stops of a plurality of stops,
reconcile the determined time and location of the individual stops with the expected stops of the route, the expected stops having an expected stop location and an expected stop time associated therewith,
identify a planned stop when the time and location of one of the plurality of stops is associated with a time and location of a corresponding one of the plurality of stored stops and identify an unplanned stop when neither the time and location of one of the plurality of stops is associated with the time and location of any of the stored stops
estimate a plurality of transition times between pairs of the plurality of stops,
construct an updated timeline based on the plurality of expected stops, the plurality of stops, and the plurality of transition times, and
update the expected timeline of the route based on the updated timeline.

7. The system of claim 6, wherein the computing device is further configured to execute computer-executable instructions in order to smooth location, heading, and speed information of the first location information and the second location information to reduce inaccuracies.

8. The system of claim 6, wherein the computing device is further configured to execute computer-executable instructions in order to at least one of identify overlapping time and location information from the first location information and the second location information and identify time and location information from only one of the first location information and the second location information.

9. The system of claim 6, wherein the computing device is further configured to execute computer-executable instructions in order to identify a skipped planned stop when the location of one of the plurality of stops is associated with the location of one of the stored stops but the time of the one of the plurality of stops is not associated with the corresponding time of the one of the stored stops and when a location of another of the stored stops does not have an associated location of another one of the plurality of stops.

10. The system of claim 6, wherein the computing device is further configured to execute computer-executable instructions in order to assign a computational cost to each of the planned stops, the unplanned stops, and the skipped stops.

* * * * *